(12) United States Patent
Hoshi et al.

(10) Patent No.: US 11,332,051 B2
(45) Date of Patent: May 17, 2022

(54) SEAT HEATER AND VEHICLE SEAT

(71) Applicant: TS TECH CO., LTD., Asaka (JP)

(72) Inventors: Yuichiro Hoshi, Tochigi (JP);
Takayoshi Ito, Tochigi (JP); Masahiro Nomura, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 239 days.

(21) Appl. No.: 16/088,637

(22) PCT Filed: Mar. 27, 2017

(86) PCT No.: PCT/JP2017/012266
§ 371 (c)(1),
(2) Date: Sep. 26, 2018

(87) PCT Pub. No.: WO2017/170336
PCT Pub. Date: Oct. 5, 2017

(65) Prior Publication Data
US 2019/0111813 A1 Apr. 18, 2019

(30) Foreign Application Priority Data

Mar. 31, 2016 (JP) .............................. JP2016-070191
Mar. 31, 2016 (JP) .............................. JP2016-070192

(51) Int. Cl.
*H05B 1/02* (2006.01)
*B60N 2/56* (2006.01)
*A47C 7/74* (2006.01)

(52) U.S. Cl.
CPC .............. *B60N 2/5642* (2013.01); *A47C 7/74* (2013.01); *B60N 2/5628* (2013.01); *B60N 2/5678* (2013.01); *H05B 1/0238* (2013.01)

(58) Field of Classification Search
CPC .. H05B 1/0236; H05B 1/0238; B60N 2/5642; B60N 2/5657; B60N 2/5628; B60N 2/56;
(Continued)

(56) References Cited

U.S. PATENT DOCUMENTS 6,676,207 B2   1/2004  Rauh et al.
6,828,528 B2  12/2004  Stöwe et al.
(Continued)

FOREIGN PATENT DOCUMENTS

CN    101492003      7/2009
JP    S50150137 A   12/1975
(Continued)

OTHER PUBLICATIONS

Office Action issued for Japanese Patent Application No. 2016-070191, Dispatch Date: Dec. 3, 2019, 10 pages including English translation.

(Continued)

*Primary Examiner* — Brian W Jennison
(74) *Attorney, Agent, or Firm* — Hamre, Schumann, Mueller & Larson, P.C.

(57) ABSTRACT

Provided are: a seat heater including a heater unit and an air blower; and a vehicle seat, whereby the whole seat can be warmed quickly and improved comfort can be provided through adjustments made in temperatures as desirable for comfort at each of the sites. The seat heater includes a heater unit disposed in a seat, a blower disposed at a portion corresponding to the heater unit, and a controller configured to regulate outputs of the heater unit and the blower. The controller is configured to: bring the blower into operation if a predetermined condition is satisfied during an operation of the heater unit; and make an output of the heater unit higher when the blower is in operation than when the blower is not in operation.

20 Claims, 12 Drawing Sheets

(58) Field of Classification Search
CPC .... A47C 7/72; A47C 7/74; B60H 1/32; B60H 1/00478
See application file for complete search history.

(56) References Cited

U.S. PATENT DOCUMENTS

| | | | |
|---|---|---|---|
| 8,417,416 B2 | 4/2013 | Bohlender et al. | |
| 9,012,812 B2 | 4/2015 | Anzai et al. | |
| 2002/0105213 A1* | 8/2002 | Rauh | B60N 2/5685 297/180.14 |
| 2003/0196998 A1 | 10/2003 | Stowe et al. | |
| 2005/0085968 A1* | 4/2005 | Panic | B60N 2/56 701/36 |
| 2006/0175877 A1* | 8/2006 | Alionte | B60N 2/5635 297/180.14 |
| 2007/0193279 A1 | 8/2007 | Yoneno et al. | |
| 2007/0234742 A1* | 10/2007 | Aoki | B60N 2/5657 62/3.3 |
| 2008/0300749 A1* | 12/2008 | Hartmann | B60N 2/5685 701/36 |
| 2009/0008377 A1* | 1/2009 | Nathan | B60N 2/5685 219/217 |
| 2009/0015042 A1 | 1/2009 | Bargheer et al. | |
| 2009/0192671 A1* | 7/2009 | Bolender | B60H 1/2218 701/36 |
| 2012/0292301 A1 | 11/2012 | Anzai et al. | |

FOREIGN PATENT DOCUMENTS

| | | |
|---|---|---|
| JP | S5466545 A | 5/1979 |
| JP | 2002262962 A | 9/2002 |
| JP | 2003104042 A | 4/2003 |
| JP | 2005253491 | 9/2005 |
| JP | 2006076398 | 3/2006 |
| JP | 2008521672 A | 6/2008 |
| JP | 2009173274 A | 8/2009 |
| JP | 2009178247 A | 8/2009 |
| JP | 2009269480 A | 11/2009 |
| JP | 2011156970 | 8/2011 |
| JP | 2012162207 | 8/2012 |

OTHER PUBLICATIONS

Office Action issued for Japanese Patent Application No. 2016-070192, Dispatch Date: Jan. 7, 2020, 8 pages including English translation.
Extended European Search Report issued for European Patent Application No. 17774873.8, dated May 7, 2019, 6 pages.
International Search Report issued for International Patent Application No. PCT/JP2017/012266, dated Jun. 6, 2017, 6 pages including English translation.
Japanese Office Action issued for Japanese Patent Application No. 2016-070191, dated Mar. 19, 2019, 8 pages, including English translation.
Japanese Office Action issued for Japanese Patent Application No. 2016-070192, dated Mar. 26, 2019, 7 pages, including English translation.
Decision of Dismissal of Amendment issued for Japanese Patent Application No. 2016-070192, Dispatch Date Sep. 23, 2020, 8 pages including English translation.
Office Action issued for Chinese Patent Application No. 201780021821.5, dated Feb. 25, 2021, 18 pages including English translation.
Office Action issued for Japanese Patent Application No. 2020-211991, Dispatch Date: Sep. 7, 2021, 5 pages including English translation.
Office Action issued for Chinese Patent Application No. 201780021821.5, dated Oct. 20, 2021, 23 pages including English translation.

* cited by examiner

SEAT HEATER AND VEHICLE SEAT

TECHNICAL FIELD

The present invention relates to a seat heater provided in a seat and a vehicle seat including the seat heater.

BACKGROUND ART

A climate-controllable seat including a heating element and an air blower, configured to be switchable between an operating condition in which only the heating element is activated and an operating condition in which both of the heating element and the air blower are activated is hitherto known in the art (see Patent Document 1).

A seat heater, for example as disclosed in Patent Document 2, includes a plurality of heating elements so arranged as to face respective contact sites of an occupant seated on the seat, and a controller configured to control heating operations of the heating elements. The seat heater disclosed in Patent Document 2 is configured, based on the fact that there exist two types of contact sites of the seated occupant, i.e., one which perceives warmth faster and thus efficiently produces a sensation of being warm in response to heat transferred, and the other which perceives warmth slower and is less sensitive to heat but possibly effective in increasing comfort in response to heat transferred, such that these two types of sites are heated one after another.

CITATION LIST

Patent Literature

Patent Document 1: JP 2003-104042 A
Patent Document 2: JP 2009-269480 A

SUMMARY OF INVENTION

The state of being kept seated for a long time on a seat in which heating elements are in operation would possibly increase humidity in contact with the seated occupant, or otherwise make an occupant feel uncomfortably sweaty or sticky. With this in view, an air blower may further be activated to form a flow of air, thereby lowering the humidity. On the other hand, activation of the air blower would cause a wind to be blown; thus or for any other reasons, the temperature of a portion of the seat with which the seated occupant is in contact would disadvantageously lower. Thus-lowering the temperature of the portion in contact would in turn possibly cause the occupant to feel cold. In particular, if the heating is lowered while the air blower is in operation as in the technical scheme disclosed in Patent Document 1, the occupant would be more likely to feel cold.

The technical scheme adopted in Patent Document 2 is configured to produce heat for two sites different in sensitivity to warmth one after another, and would possibly be unable to quickly heat the whole seat. Also in the technical scheme in Patent Document 2, heat is produced one after another for two groups of sites different in the sensitivity to warmth, and thus, depending on a particular site of each group, the heating operation would be switched before reaching an optimum temperature for providing comfort at that particular site, to a mode for heating the sites of the other group; or the temperature would exceed an optimum temperature for providing comfort at that particular site at a time earlier than a time for switching the heating operation to a mode for heating the sites of the other group, and continue to be excessively high; or otherwise, optimum adjustment of temperature for providing comfort at each of the sites of the respective groups would possibly be unable to be made.

Therefore, it is an object of the present invention to provide a seat heater (and a vehicle seat) in which a heater unit and an air blower are provided such that the comfort can be improved.

It is another object of the present invention to make it possible to quickly warm the whole seat as well as to adjust the temperature as desirable for comfort at each of the sites.

The present invention for achieving any of the above-mentioned objects relates to a seat heater comprising: a heater unit disposed in a seat; an air blower disposed at a portion corresponding to the heater unit; and a controller configured to regulate outputs of the heater unit and the air blower, wherein the controller is configured to: bring the air blower into operation if a predetermined condition is satisfied during an operation of the heater unit; and make an output of the heater unit higher when the air blower is in operation than when the air blower is not in operation.

With this configuration, because the air blower is brought into operation if a predetermined condition is satisfied during an operation of the heater unit, the humidity of a contact portion of the seat with which the occupant is in contact can be lowered, so that sweaty, sticky or any other uncomfortable feel the occupant would perceive can be suppressed. In addition, because the output of the heater unit is higher when the air blower is in operation than when the air blower is not in operation, any undesirable lowering of the temperature of the contact portion which would be caused by the operation of the air blower can be suppressed, so that the seat can be kept in warm condition. Therefore, the heater configuration with the heater unit and the air blower can be provided with improved comfort.

The seat heater as described above may be configured such that the controller is capable of changing the output of the air blower in operation.

With this configuration, in comparison with an alternative configuration in which the air blower is regulated only through on-off control, the air blower can be operated with its output regulated adequately, so that when the air blower is in operation, humidity of the contact portion can be lowered satisfactorily while decrease in temperature of the contact portion can be prevented or reduced appropriately. Accordingly, the comfort can be improved more.

In the seat heater as describe above, the controller may be configured to regulate the output of the air blower based on an ambient temperature that is a temperature of an environment surrounding the seat.

With this configuration, the output of the air blower can be regulated in accordance with the ambient temperature; therefore, when the air blower is in operation, humidity of the contact portion can be lowered more satisfactorily while decrease in temperature of the contact portion can be prevented or reduced more appropriately. Accordingly, the comfort can be improved furthermore. In addition, since the output of the air blower is not likely to become higher than necessary, improved energy efficiency can be achieved.

In the seat heater as described above, the controller may be configured to obtain, as the ambient temperature, a set temperature of an air conditioner that regulates the temperature of the environment surrounding the seat.

With this configuration, the control over the air blower can be associated with the control over the air conditioner, and thus the comfort can be improved furthermore, and the energy efficiency can be improved furthermore. Moreover, the seat heater may not necessarily be provided with a sensor for obtaining the ambient temperature, so that the cost of the seat heater can be saved.

In the seat heater as described above, the controller may be configured to regulate the output of the heater unit in such a manner that a temperature of a portion of the seat at which the heater unit is disposed is made higher than the ambient temperature.

This configuration makes its produced warmth more effectively perceivable, and thus can increase the comfort furthermore.

In the seat heater as described above, the controller may be configured to set the outputs of the air blower and the heater unit in accordance with a change in the ambient temperature.

With this configuration, the outputs of the air blower and the heater unit can be regulated in accordance with the change in the ambient temperature; therefore, the comfort can be improved furthermore, and the energy efficiency can be improved furthermore.

The seat heater as describe above may further comprise a temperature sensor disposed at a portion corresponding to the heater unit, and the controller may be configured to regulate the output of the air blower based on a sensed temperature obtained from the temperature sensor.

With this configuration, the output of the air blower can be regulated in accordance with the actual temperature of the portion corresponding to the heater unit; therefore, when the air blower is put into operation, the humidity of the contact portion can be lowered more satisfactorily, and the decrease in the temperature of the contact portion can be prevented or reduced more appropriately. Accordingly, the comfort can be improved furthermore. In addition, since the output of the air blower is not likely to become higher than necessary, improved energy efficiency can be achieved.

The seat heater as described above may further be configured such that the heater unit includes a first heater unit and a second heater unit disposed at a portion of the seat different from a portion at which the first heater unit is disposed, and the air blower includes a first air blower disposed at a portion corresponding to the first heater unit and a second air blower disposed at a portion corresponding to the second heater unit, wherein the controller may be configured to regulate the outputs of the first air blower and the second air blower individually.

With this configuration, optimized control can be exercised over the first air blower and the second air blower, respectively, and the comfort can be improved furthermore.

In the seat heater as described above, the controller may be configured to set target temperatures for regulating the output of the heater unit, such that a target temperature set when the air blower is in operation is higher than a target temperature set when the air blower is not in operation.

Alternatively, the seat heater as described above may further comprise a temperature sensor disposed at a portion corresponding to the heater unit, and the controller may be configured to make the output of the heater unit as set in accordance with a sensed temperature obtained from the temperature sensor higher when the air blower is in operation than when the air blower is not in operation.

Alternatively, the seat heater as described above may be configured such that the seat heater comprises: a plurality of heater units disposed at different portions of the seat; and a controller configured to regulate outputs of the plurality of heater units, wherein the controller is configured to exercise a first control in which upon receipt of an instruction to heat the seat, output rates of all the heater units, each output rate being defined as a rate of an output to a maximum output of each heater unit, are equated until a temperature of at least one of the portions at which the heater units are disposed is increased to a predetermined temperature, and a second control in which the output rates of the heater units are regulated individually for the respective heater units after the temperature of the at least one of the portions at which the heater units are disposed reaches the predetermined temperature.

With this configuration, in the first control, the output rates of the heater units are equated until the temperature of a portion at which a heater unit is disposed is increased to a predetermined temperature; therefore, the whole seat can be warmed quickly. Moreover, after the whole seat is warmed quickly, the output rates of the heater units are regulated individually for the respective heater units in the second control; therefore, the temperatures of the portions at which the heater units are disposed can be regulated respectively to achieve comfortable temperature profile.

The seat heater as described above may be configured such that the plurality of heater units include a third heater unit and a fourth heater unit, the seat heater further comprises a temperature sensor disposed at a portion corresponding to the third heater unit, and the controller is configured to regulate an output rate of the third heater unit based on a sensed temperature obtained from the temperature sensor.

With this configuration, the output rate of the third heater unit can be regulated precisely.

In the seat heater as described above, the controller may be configured to regulate an output rate of the fourth heater unit based on the sensed temperature.

With this configuration, provision of another temperature sensor disposed at a portion corresponding to the fourth heater unit is not necessitated, so that the cost of the seat heater can be saved.

The seat heater as described above may be configured such that the third heater unit is disposed at a portion corresponding to a waist of an occupant seated on the seat, and the fourth heater unit is disposed at at least one of a portion corresponding to a seat surface of a seat cushion and a portion above the portion corresponding to the waist.

With this configuration, in which the temperature sensor is disposed at the portion corresponding to the waist so as to control the relevant portion with high precision (in this regard, the research has shown that there exists difference in temperature sensation between the waist and a femoral or other region to be in contact with the seat surface of the seat cushion or a shoulder or other region located above the waist), the comfort ensured during the quick warming control and the individually regulated control can be improved.

In the seat heater as described above, the controller may be configured to set, in the first control, the output rates of all the heater units at 100%.

With this configuration, the whole seat can be warmed more quickly in the first control.

In the seat heater as described above, the controller may be configured to regulate the output rates of the heater units based on an ambient temperature that is a temperature of an environment surrounding the seat.

With this configuration, the seat can be warmed in accordance with the ambient temperature; therefore, the comfort ensured during the quick warming control and the individually regulated control can be improved. In addition, since the seat is not likely to be made warmer than necessary, improved energy efficiency can be achieved.

In the seat heater as described above, the controller may be configured to set target temperatures for regulating the output rates of the heater units in accordance with a change in the ambient temperature.

With this configuration, the outputs of the heater units can be raised or lowered in accordance with the change in the ambient temperature; therefore, the comfort can be improved furthermore, and the energy efficiency can be improved furthermore.

In the seat heater as described above, the controller may be configured to obtain, as the ambient temperature, a set temperature of an air conditioner that regulates the temperature of the environment surrounding the seat.

With this configuration, the control over the seat heater can be associated with the control over the air conditioner, and thus the comfort can be improved furthermore, and the energy efficiency can be improved furthermore. Moreover, the seat heater may not necessarily be provided with a sensor for obtaining the ambient temperature, so that the cost of the seat heater can be saved.

In the seat heater as described above, the controller may be configured to make the output rates of the heater units lower in the second control than in the first control.

With this configuration, the whole seat can be warmed quickly in the first control and the energy efficiency can be improved in the second control.

The present invention for achieving any of the above-mentioned objects may also be configured as a vehicle seat comprising a seat heater as described above.

DESCRIPTION OF EMBODIMENTS

Hereafter, a description will be given of a first embodiment of the present invention with reference made to the accompanying drawings. It is to be appreciated that any of elements which will be explained in relation to illustrative embodiments and their modifications may be selectively combined as desired for practical implementation.

Figure 1:
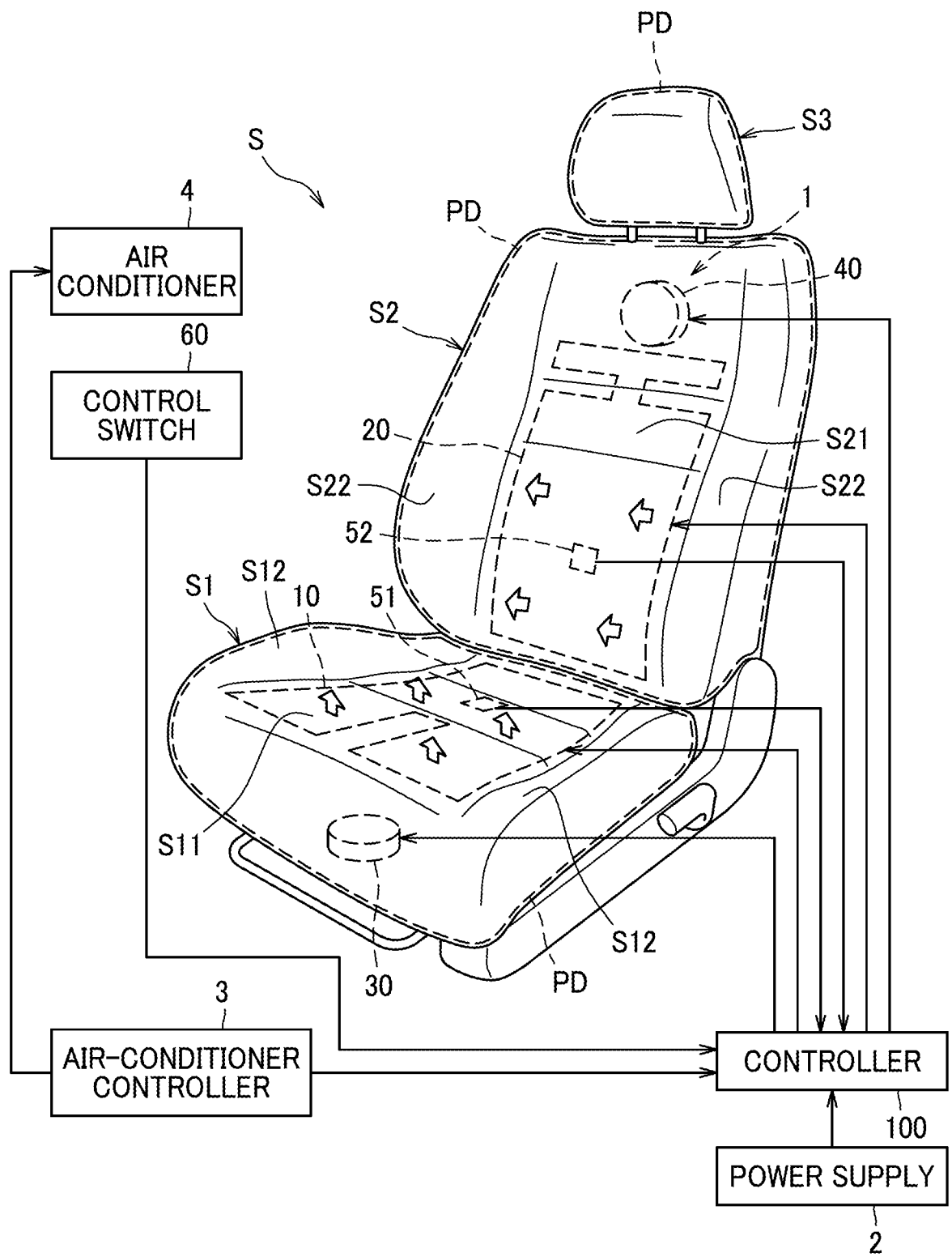
FIG. 1 is a perspective view of a vehicle seat according to a first embodiment.

A vehicle seat according to this embodiment is configured, for example, as shown in FIG. 1, as a car seat S installed in an automobile. The car seat S includes a seat cushion S1, seat back S2 and a headrest S3 which are upholstered with a pad material made of urethane foam or other cushiony material and an outer covering material made of synthetic leather, fabrics or the like with which the pad material is covered.

The seat cushion S1 includes a seat surface portion S11 arranged in a laterally central position and configured to contact and support from below the buttocks and femoral regions of an occupant seated on the car seat S, and projecting portions S12 arranged on laterally outer sides of the seat surface portion S11 and configured to jut out on an occupant side so as to support the sides of the buttocks and femoral regions of the seated occupant. The seat back S2 includes a seat surface portion S21 arranged in a laterally central position and configured to contact and support from behind the back of the seated occupant, and projecting portions S22 arranged on laterally outer sides of the seat surface portion S21 and configured to jut out on the occupant side so as to support the sides of an upper body of the seated occupant.

The car seat S includes a seat heater 1. The seat heater 1 mainly includes a first heater unit 10 and a second heater unit 20 as an example of a heater unit, a first blower 30 and a second blower 40 as an example of an air blower, temperature sensors 51, 52, a control switch 60, and a controller 100.

The first heater unit 10 and the second heater unit 20 are each configured as a sheet-type heater. The first heater unit 10 is disposed between the pad material and the outer covering material of the seat cushion S1. To be more specific, the first heater unit 10 is disposed at a portion corresponding to the seat surface of the seat cushion S1, i.e., at the seat surface portion S11. The second heater unit 20 is disposed at a portion of the car seat S different from the portion at which the first heater unit 10 is disposed; more specifically, the second heater unit 20 is disposed between the pad material and the outer covering material of the seat back S2. To be more specific, the second heater unit 20 is disposed at a portion corresponding to the seat surface of the seat back S2, i.e., at the seat surface portion S21.

The first blower 30 and the second blower 40 are each configured as a sirocco fan. The first blower 30 is disposed at a portion corresponding to the first heater unit 10, more specifically, inside the seat cushion S1. The second blower 40 is disposed at a portion corresponding to the second heater unit 20, more specifically, inside the seat back S2. The first blower 30 and the second blower 40 are each configured to have its output (rpm of an impeller) changeable in a range of 0 to 100% in accordance with a magnitude of an electric power supplied thereto.

Although not illustrated in the drawings, the pad material for the seat cushion S1 and the seat back S2 has a plurality of air vents formed on a surface thereof, and air passages connected to the air vents. The blowers 30, 40 are connected to the air passages of the pad material via ducts disposed inside the seat cushion S1 and the seat back S2. With this configuration, the seat cushion S1 and the seat back S2 are configured to blow out air which are forced by the blowers 30, 40 in operation to flow through the air vents and the outer covering material, from the seat surface portions S11, S12 against the seated occupant.

The first heater unit 10, the second heater unit 20, the first blower 30 and the second blower 40 are each connected to the controller 100. In the present embodiment, the first blower 30 corresponds to "first air blower" and the second blower 40 corresponds to "second air blower".

The temperature sensor 51 is disposed inside the outer covering material at the seat surface portion S11 that is a portion corresponding to the first heater unit 10. The temperature sensor 52 is disposed inside the outer covering material at the seat surface portion S21 that is a portion corresponding to the second heater unit 20. The temperature sensors 51, 52 are connected to the controller 100 and configured to produce and transmit information on their sensed temperatures to the controller 100. It is to be understood that there is a fairly definite correlation between the temperature sensed by each temperature sensor 51, 52 and the temperature of a portion of the corresponding seat surface portion S11, S21 with which the seated occupant is in contact. Accordingly, the controller 100 may be configured to use the temperature sensed by the temperature sensor 51, 52 as a sensed temperature Ts for control, or may be configured to estimate the temperature of the portion with which the seated occupant is in contact, based on the correlation mentioned above and use the estimated temperature as the sensed temperature Ts for control.

The controller 100 is a device that regulates the outputs of the heater units 10, 20 and the blowers 30, 40, and is disposed in an appropriate location inside the car seat S. The controller 100 may be disposed outside the car seat S. The controller 100 is supplied with electric power from a battery-type power supply 2 installed in the car, and configured to use this electric power to regulate the outputs of the heater units 10, 20 and the blowers 30, 40.

The controller 100 is connected to an air-conditioner controller 3 provided in the car. The air-conditioner controller 3 is a device configured to exercise control over an air conditioner 4 that regulates a temperature of an environment surrounding the car seat S (i.e., ambient temperature), more specifically, a temperature in the interior of the car. The controller 100 is configured to obtain, as the ambient temperature (hereinafter referred to as "in-car temperature Tr"), a set temperature of the air conditioner 4 from the air-conditioner controller 3. A control switch 60 provided on a dashboard or other control panel of the car is connected to the controller 100.

The controller 100 is configured to activate the heater units 10, 20, upon receipt of an instruction to heat the car seat S issued when the control switch 60 is thrown. In this process, the controller 100 is configured to regulate the outputs (to be more specific, the output rates) of the first heater unit 10 and the second heater unit 20, mainly based on the sensed temperatures Ts obtained from the temperature sensors 51, 52 and the in-car temperature Tr obtained from the air-conditioner controller 3. The output rate, herein referred to, of each heater unit 10, 20 is defined as a rate of an output to a maximum output of the heater unit 10, 20.

Figure 2:
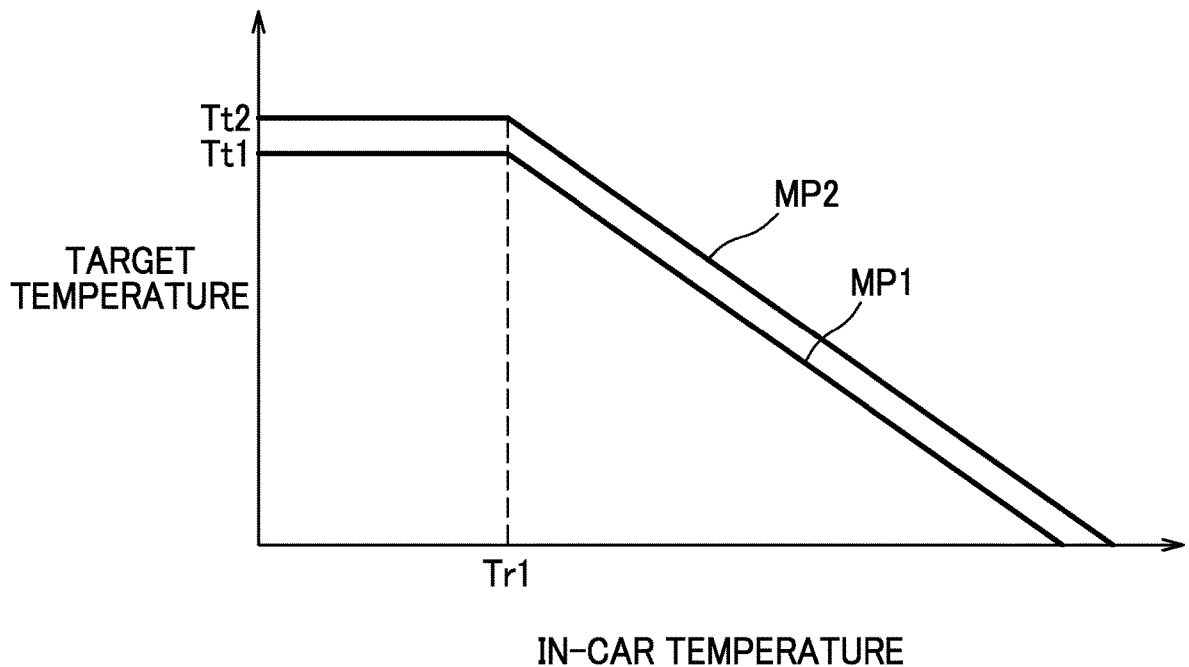
FIG. 2 is an example of a map showing a relationship between an in-car temperature and a target temperature.

To be more specific, the controller 100, first, sets a target temperature Tt based on the in-car temperature Tr and a map MP1 as shown in FIG. 2. The map MP1 shown in FIG. 2 is a map established in advance through experiments, simulations, or the like, for correlating the in-car temperature Tr and the target temperature Tt. In the map MP1 of FIG. 2, the target temperature Tt is, for example, characterized as having a constant value Tt1, if the in-car temperature Tr is lower than Tr1, while decreasing according as the in-car temperature Tr increases, if the in-car temperature Tr is not lower than Tr1. In addition, although not illustrated in the drawings, the map MP1 includes a map MP11 for use in regulating the output rate of the first heater unit 10 and a map MP12 for use in regulating the output rate of the second heater unit 20, which maps MP11, MP12 are prepared individually. For example, since the research has shown that a temperature at which the waist (which the second heater unit 20 faces) of the seated occupant feels comfortable is higher than a temperature at which the femoral or other region (which the first heater unit 10 faces) of the seated occupant feels comfortable, the map MP12 may be prepared such that any target temperature Tt to be set with reference thereto is higher than a corresponding target temperature Tt to be set for the same in-car temperature Tr with reference to the map MP11.

The controller 100 then computes necessary manipulation amounts mv based on the set target temperatures Tt and the sensed temperatures Ts. To be more specific, the controller 100 computes a necessary manipulation amount mv for the first heater unit 10 based on the target temperature Tt set from the in-car temperature Tr and the map MP11 and the sensed temperature Ts obtained by the temperature sensor 51, and computes a necessary manipulation amount mv for the second heater unit 20 based on the target temperature Tt set from the in-car temperature Tr and the map MP12 and the sensed temperature Ts obtained by the temperature sensor 52. The necessary manipulation amount mv may be computed, for example, as input manipulated valuable in the so-called PI control:

$$mv = Kp \times e + ie/Ki$$

where e is a difference between the target temperature Tt and the sensed temperature Ts, Kp is a proportional control constant, ie is an integral (integration) of e for a predetermined period of time in the past, and Ki is an integral control constant. Each of the constants Kp, Ki is established in advance through experiments, simulations, or the like.

It is to be understood that the sensed temperature Ts and the target temperature Tt to be assigned for this computation may not necessarily be expressed in the unit degree centigrade (° C.) or the like scale of temperature, but may be numerical values derived from voltages outputted from the temperature sensors 51, 52. Each of the constants Kp, Ki may be adjusted to the scale adopted as these variables for the temperatures. It is also to be understood that the value resulting from the aforementioned computation, mv may exceed 100 if the difference e between the target temperature Tt and the sensed temperature Ts is great. As the electric power is supplied to the heater units 10, 20 at the output rate of 0 to 100%, the value mv exceeding 100 is assumed to be 100, so that mv has a value not greater than 100.

The controller 100 exercises control over the heater units 10, 20 based on the computed necessary manipulation amounts mv (output rates). To be more specific, the controller 100 exercises control over the first heater unit 10 based on the computed necessary manipulation amount mv for the first heater unit 10, and exercises control over the second heater unit 20 based on the computed necessary manipulation amount mv for the second heater unit 20.

As described above, the target temperatures Tt are set based on the in-car temperature Tr and the map MP1 and the necessary manipulation amounts mv are computed based on the set target temperatures Tt and the sensed temperature Ts; the controller 100 is thus configured to set the outputs of the heater units 10, 20 in accordance with the change in the in-car temperature Tr.

The controller 100 is configured to bring the blowers 30, 40 into operation if a predetermined condition is satisfied during operations of the heater units 10, 20. To be more specific, the controller 100 brings the first blower 30 into operation if a predetermined period of time Tp has passed after the first heater unit 10 comes into operation. Similarly, the controller 100 brings the second blower 40 into operation if a predetermined period of time Tp has passed after the second heater unit 20 comes into operation.

Possibly, an occupant continuously seated on the car seat S in which the heater units 10, 20 are in operation and the blowers 30, 40 are not in operation would suffer discomfort such as sweaty, sticky or any other uncomfortable feel, for example, by increase in humidity of the seat surface portions S11, S12 or the like of the car seat S in contact with the seated occupant. Therefore, in the present embodiment, when a predetermined period of time Tp has passed after the heater units 10, 20 come into operation, an increase in humidity of the seat surface portions S11, S21 or the like is presumed and the blowers 30, 40 are thus brought into operation. In this respect, the predetermined period of time Tp is predetermined through experiments, simulations or the like, as a period of time of which lapse after the heater units 10, 20 come in operation affords the basis for assumption of a predetermined amount of increase of the humidity of the seat surface portions S11, S12 or the like. It is to be understood that the predetermined period of time Tp for use in controlling the blower 30 and the predetermined period of time TP for use in controlling the blower 40 may have the same value or values different from each other.

Figure 3:
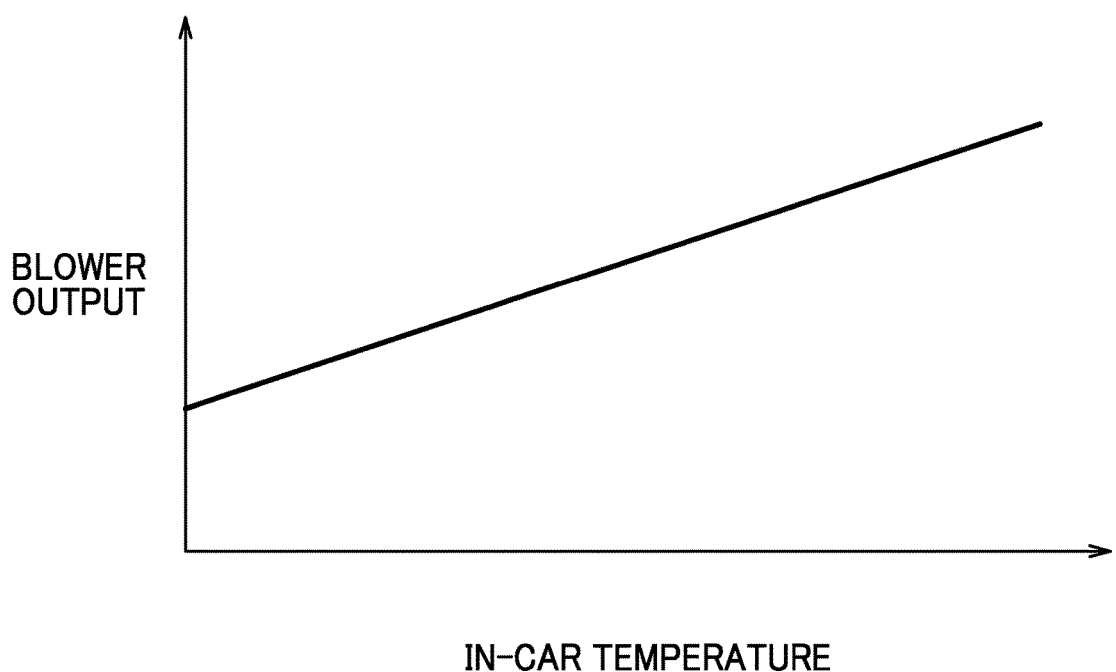
FIG. 3 is an example of a map showing a relationship between the in-car temperature and a blower output.

When the controller 100 causes the blowers 30, 40 to operate, the controller 100 is configured to regulate outputs of the first blower 30 and the second blower 40 based on the in-car temperature Tr obtained from the air-conditioner controller 3. To be more specific, the controller 100 sets the outputs of the blowers 30, 40 based on the in-car temperature Tr and a map shown in FIG. 3. The map shown in FIG. 3 is a map established in advance through experiments, simulations, or the like, for correlating the in-car temperature Tr and the outputs of the blowers 30, 40. The map of FIG. 3 is established, by way of example, such that the outputs of the blowers 30, 40 increase according as the in-car temperature Tr increases.

Although not illustrated in the drawings, the map of FIG. 3 is established individually for use in regulating the output of the first blower 30 and for use in regulating the output of the second blower 40. For example, because it has been shown as described above that a temperature at which the waist feels comfortable is higher than a temperature at which the femoral or other region feels comfortable, the map for the second blower 40 may be established such that any output to be set with reference thereto is lower than a corresponding output to be set for the same in-car temperature Tr with reference to the map for the first blower 30 so that the rate of decrease of temperature caused by the operation of the second blower 40 for the seat surface portion S21 which faces the waist is made low. Conversely, the map for the first blower 30 may be established such that any output to be set with reference thereto is lower than a corresponding output to be set for the same in-car temperature Tr with reference to the map for the second blower 40. In this way, the controller 100 is configured to regulate the outputs of the first blower 30 and the second blower 40 individually.

As described above, the outputs of the blowers 30, 40 are set based on the maps showing the relationship between the in-car temperature Tr and the output, whereby the controller 100 is configured to set the outputs of the blowers 30, 40 in accordance with the change in the in-car temperature Tr. In addition, the controller 100 is capable of changing the outputs of the blowers 30, 40 in operation, in a range greater than 0% (stop) and not greater than 100%.

The controller 100 is configured to make the outputs of the heater units 10, 20 higher when the blowers 30, 40 are in operation than when the blowers 30, 40 are not in operation. To be more specific, the controller 100 is configured to set the target temperatures Tt for regulating the outputs (necessary manipulation amounts mv) of the heater units 10, 20, such that target temperatures Tt set when the blowers 30, 40 are in operation are higher than target temperatures Tt set when the blowers 30, 40 are not in operation.

More specifically, as shown in FIG. 2, the controller 100 sets the target temperatures Tt by consulting the map MP1 when the blowers 30, 40 are not in operation, and sets the target temperatures Tt by consulting the map MP2 when the blowers 30, 40 are in operation. The map M2 is established, by way of example, such that the target temperature Tt is characterized as having a constant value Tt2 (Tt2>Tt1), if the in-car temperature Tr is lower than Tr1, while decreasing according as the in-car temperature Tr increases, if the in-car temperature Tr is not lower than Tr1. The map MP2 is prepared such that any target temperature Tt to be set with reference thereto is higher than a corresponding target temperature Tt to be set for the same in-car temperature Tr with reference to the map MP1. In this way, the controller 100 is configured to make the target temperature Tt higher when the blower is in operation than when the blower is not in operation. Although not illustrated in the drawings, the map MP2, as well, includes a map MP21 for use in regulating the output rate of the first heater unit 10 and a map MP22 for use in regulating the output rate of the second heater unit 20, which maps MP21, MP22 are prepared individually.

Each map MP1, MP2 is prepared such that the temperatures of the seat surface portions S11, S21 are made higher than the in-car temperature Tr under control exercised over the heater units 10, 20 by the necessary manipulation amounts mv computed based on the target temperatures Tt set with reference to the maps MP1, MP2. Accordingly, the controller 100 is configured to regulate the outputs of the heater units 10, 20 in such a manner that the temperatures of the seat surface portions S11, S21 (portions of the car seat S at which the heater units 10, 20 are disposed) are made higher than the in-car temperature Tr.

A description will be given of a process carried out by the controller 100 in the car seat S as described above, with reference made to FIGS. 4 and 5. The controller 100 performs the process shown in FIG. 4 for each heater unit 10, 20 individually, and performs the process shown in FIG. 5 for each blower 30, 40, individually. The controller 100 repeats the process from START to END shown in FIG. 4 for each control cycle, and in parallel therewith, repeats the process from START to END shown in FIG. 5 for each control cycle.

Figure 4:
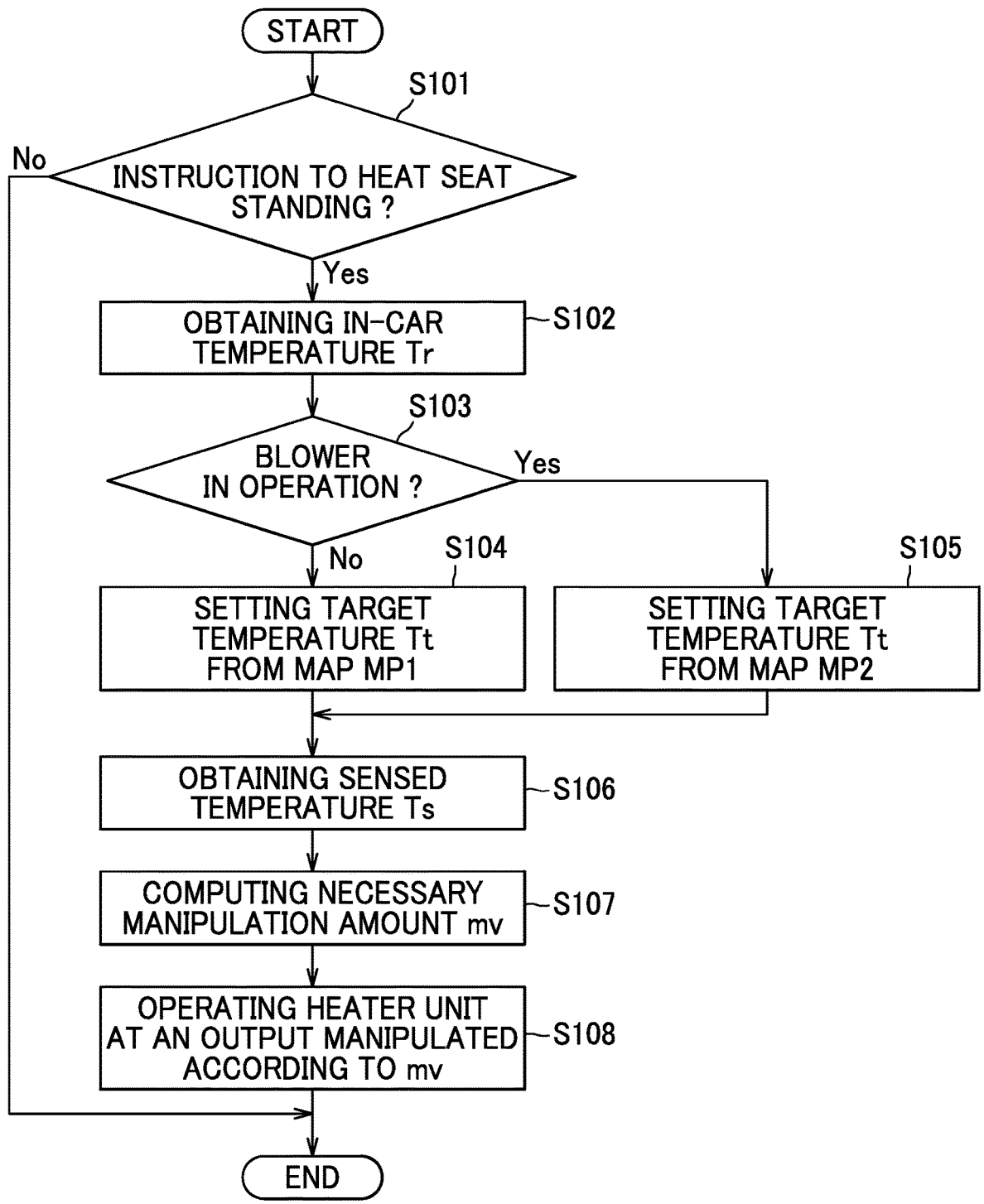
FIG. 4 is a flowchart showing a process of control exercised over a heater unit by a controller.

As shown in FIG. 4, the controller 100 first determines whether or not an instruction to heat the seat stands (S101). If no instruction to heat the seat stands (No, in S101), then the controller 100 brings this cycle of the process of FIG. 4 to an end.

On the other hand, if an instruction to heat the seat stands (Yes, in S101), then, the controller 100 obtains an in-car temperature Tr (S102). In addition, the controller 100 determines whether or not a corresponding blower 30, 40 is in operation (S103). If the corresponding blower 30, 40 is not in operation (No, in S103), then the controller 100 sets a target temperature Tt from the in-car temperature Tr and the map MP1 of FIG. 2 (S104). Subsequently, the controller 100 obtains a sensed temperature Ts (S106), and computes a necessary manipulation amount mv based on the target temperature Tt and the sensed temperature Ts (S107). Thereafter, the controller 100 operates the heater unit 10, 20 at an output manipulated according to the necessary manipulation amount mv (S108), and brings this cycle of the process of FIG. 4 to an end.

Figure 5:
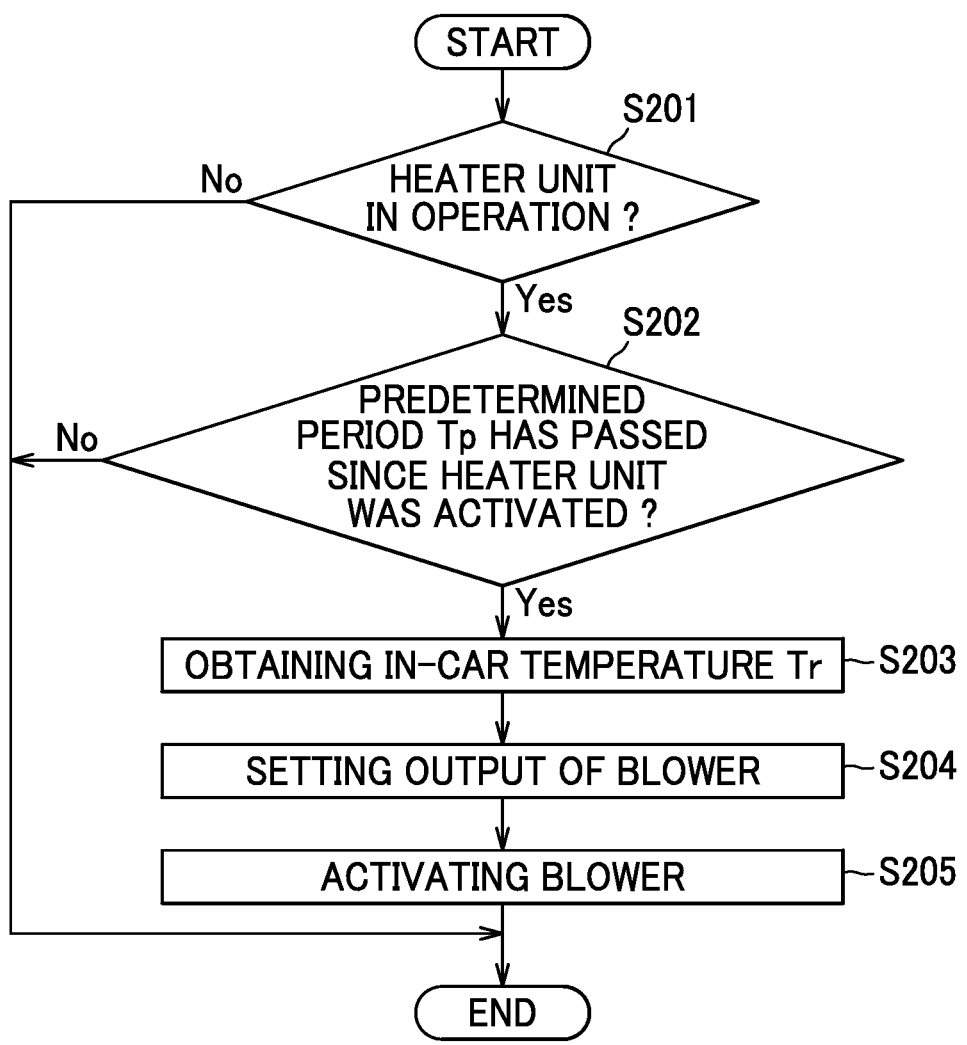
FIG. 5 is a flowchart showing a process of control exercised over a blower by the controller.

As shown in FIG. 5, the controller 100 determines whether or not the corresponding heater unit 10, 20 is in operation (S201). If the corresponding heater unit 10, 20 is not in operation (No, in S201), then the controller 100 brings this cycle of the process of FIG. 5 to an end. On the other hand, if the corresponding heater unit 10, 20 is in operation (Yes, in S201), then the controller determines whether or not a predetermined period of time Tp has passed since the corresponding heater unit 10, 20 came into operation (S202).

If the predetermined period of time Tp has not passed since the corresponding heater unit 10, 20 came into operation (No, in S202), then the controller 100 brings this cycle of the process of FIG. 5 to an end. On the other hand, if the predetermined period of time Tp has passed since the corresponding heater unit 10, 20 came into operation (Yes, in S202), then the controller 100 obtains the in-car temperature Tr (S203) and sets the output of the blower 30, 40 from the map of FIG. 3 (S204). Thereafter, the controller 100 activates the blower 30, 40, causing the blower 30, 40 to operate at the thus-set output (S205), and brings this cycle of the process of FIG. 5 to an end.

In step S103 of FIG. 4, if the corresponding blower 30, 40 is in operation (Yes, in S103), then the controller 100 sets a target temperature Tt from the in-car temperature Tr and the map MP2 of FIG. 2 (S105). Subsequently, the controller 100 obtains a sensed temperature Ts (S106), and computes a necessary manipulation amount mv based on the target temperature Tt and the sensed temperature Ts (S107). Thereafter, the controller 100 operates the heater unit 10, 20 at an output manipulated according to the necessary manipulation amount mv (S108), and brings this cycle of the process of FIG. 4 to an end.

Figure 6:
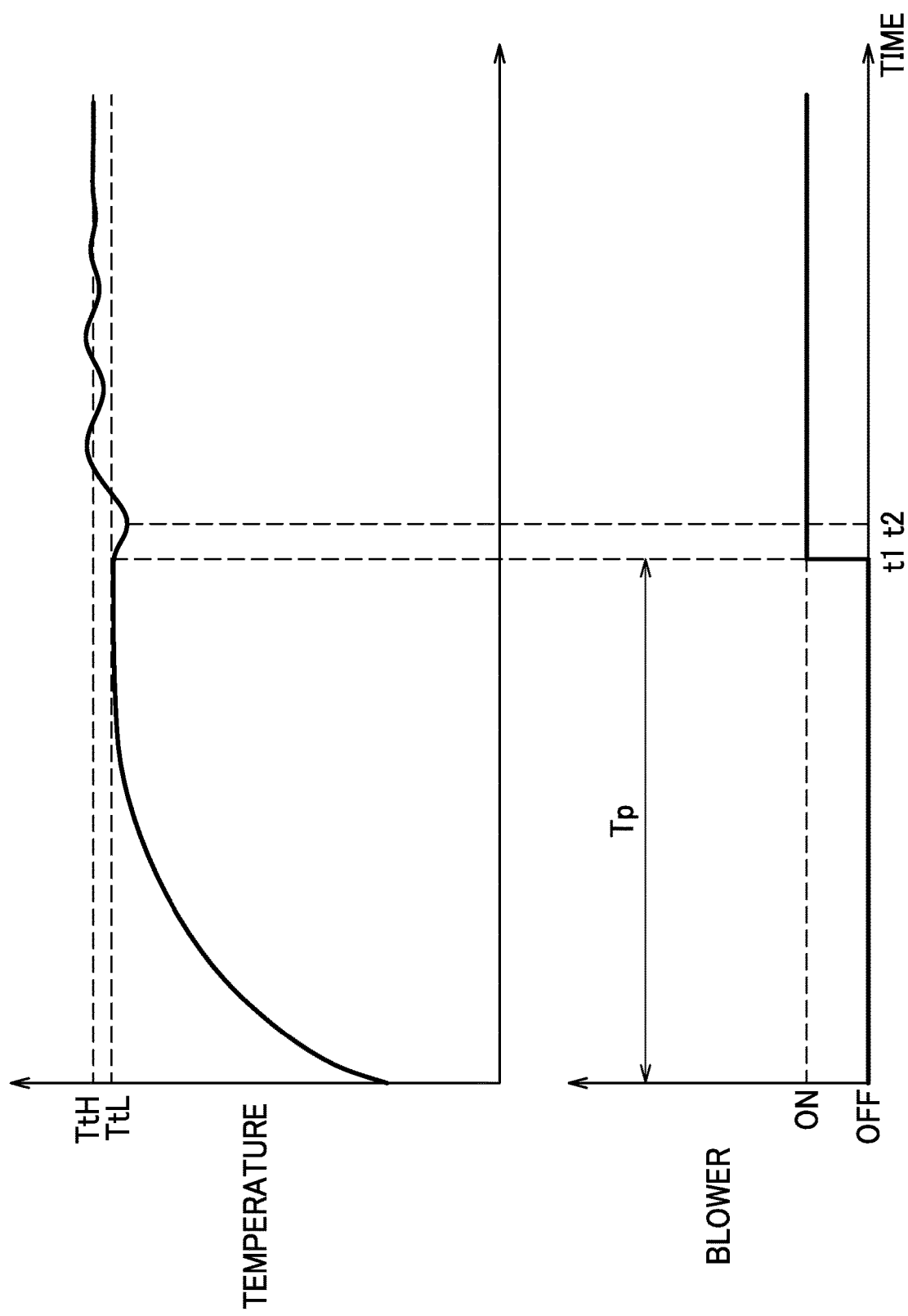
FIG. 6 is a timing diagram showing a change in temperature of a portion at which the heater unit is disposed and a state of operation of the blower.

In the process described above, when the seated occupant throws the control switch 60 to start heating the car seat S, the temperatures of the seat surface portions S11, S21 change as shown in FIG. 6. To be more specific, before a time t1 at which the blowers 30, 40 are put into operation, each heater unit 10, 20 is controlled according to the necessary manipulation amount mv computed from a target temperature TtL set from the map MP1 of FIG. 2, and the warming proceeds so that the temperature goes up toward the target temperature TtL. When the temperatures of the seat surface portions S11, S12 are kept around the target temperature TtL, the humidity of the seat surface portions S11, S12 rises due to sweat oozing from the seated occupant, or the like.

At the time t1 after a lapse of the predetermined period of time Tp since the heater units 10, 20 are put into operation, it is assumed as certain that the humidity of the seat surface portions S11, S12 rises up to a certain point; therefore, the blowers 30, 40 are brought into operation at set outputs. When the blowers 30, 40 are brought into operation, the heater units 10, 20 are controlled according to the necessary manipulation amounts mv computed from target temperatures TtH set from the maps MP2 of FIG. 2, and thus their outputs are made higher than before the blowers 30, 40 are brought into operation.

After the time t1, the blowers 30, 40 operate to thereby blow air from the seat surface portions S11, S21 against the seated occupant, causing airflow through between the seat surface portions S11, S21 and the seated occupant, whereby the humidity of the seat surface portions S11, S21 can be reduced. In this way, sweaty, sticky or any other uncomfortable feel the occupant would perceive can be suppressed, while the heater units 10, 11 are kept in operation.

On the other hand, the temperatures of each seat surface portions S11, S21 temporarily lower as represented in the graph (see the section from the time t1 to a time t2), because air blown against the seat surface portions S11, S21 and/or the seated occupant by the blowers 30, 40 in operation removes heat therefrom. However, since the outputs of the heater units 10, 20 are higher than before the blowers 30, 40 are put into operation, the seat surface portions S11, S21 are quickly warmed so that the temperature goes up toward a target temperature TtH that is higher than the target temperature TtL. Accordingly, the temperatures of the seat surface portions S11, S21 can be raised quickly before the seated occupant feels cold. As a result, any undesirable lowering of the temperatures of the seat surface portions S11, S21 which would be caused by the operation of the blowers 30, 40 can be suppressed, so that the seat surface portions S11, S21 can be kept in warm condition.

According to the present embodiment as described above, if it is assumed that the humidity of the seat surface portions S11, S21 increase during operation of the heater units, the blowers 30, 40 are brought into operation; therefore, the humidity of the seat surface portions S11, S21 can be lowered, so that the sweaty, sticky or any other uncomfortable feel the seated occupant would perceive can be suppressed. In addition, because the outputs of the heater units 10, 20 are made higher when the blowers are in operation than when the blowers are not in operation, any undesirable lowering of the temperature of the seat surface portions S11, S21 which would be caused by the operation of the blowers 30, 40 can be suppressed, so that the car seat S can be kept in warm condition. Therefore, the heater configuration with the heater units 10, 20 and the blowers 30, 40 can be provided with improved comfort.

Since the controller 100 is capable of changing the outputs of the blowers 30, 40 in operation, the blowers 30, 40 can be operated with their outputs regulated adequately in comparison with an alternative configuration in which the blowers are regulated only through on-off control. Consequently, when the blowers 30, 40 are in operation, humidity of the seat surface portions S11, S21 can be lowered satisfactorily while decrease in temperatures of the seat surface portions S11, S21 can be prevented or reduced appropriately, so that the comfort can be improved more.

Since the controller 100 regulates the outputs of the blowers 30, 40 based on the in-car temperature Tr, the outputs of the blowers 30, 40 can be regulated in accordance with the in-car temperature Tr. Therefore, when the blowers 30, 40 are in operation, humidity of the seat surface portions S11, S21 can be lowered more satisfactorily while decrease in the temperatures of the seat surface portions S11, S21 can be prevented or reduced more appropriately; accordingly, the comfort can be improved furthermore. In addition, since the outputs of the blowers 30, 40 are not likely to become higher than necessary, improved energy efficiency can be achieved.

Since the controller 100 obtains, as the in-car temperature Tr, the set temperature of the air conditioner 4, the control over the blowers 30, 40 can be associated with the control over the air conditioner 4, and thus the comfort can be improved furthermore, and the energy efficiency can be improved furthermore. Moreover, the seat heater 1 may not necessarily be provided with a sensor for obtaining the in-car temperature Tr, so that the cost of the seat heater 1 can be saved.

Since the controller 100 regulates the outputs of the heater units 10, 20 in such a manner that the temperatures of portions of the car seat S at which the heater units 10, 20 are disposed are made higher than the in-car temperature Tr, the warmth produced can be more effectively perceivable, and the comfort can be increased furthermore.

Since the controller 100 sets the outputs of the heater units 10, 20 and the blowers 30, 40 in accordance with a change in the in-car temperature Tr, the outputs of the heater units 10, 20 and the blowers 30, 40 can be regulated properly in accordance with the change in the in-car temperature Tr. Therefore, the comfort can be improved furthermore, and the energy efficiency can be improved furthermore.

Since the outputs of the first blower 30 and the second blower 40 are regulated individually, optimized control can be exercised over the first blower 30 and the second blower 40, so that the comfort can be improved furthermore.

Next, a description will be given of a second embodiment. In the present embodiment, the same elements as those described in the first embodiment will be designated by the same reference characters, and a description thereof will be omitted where appropriate; a detailed description will be focused on aspects different from those of the first embodiment.

Figure 7:
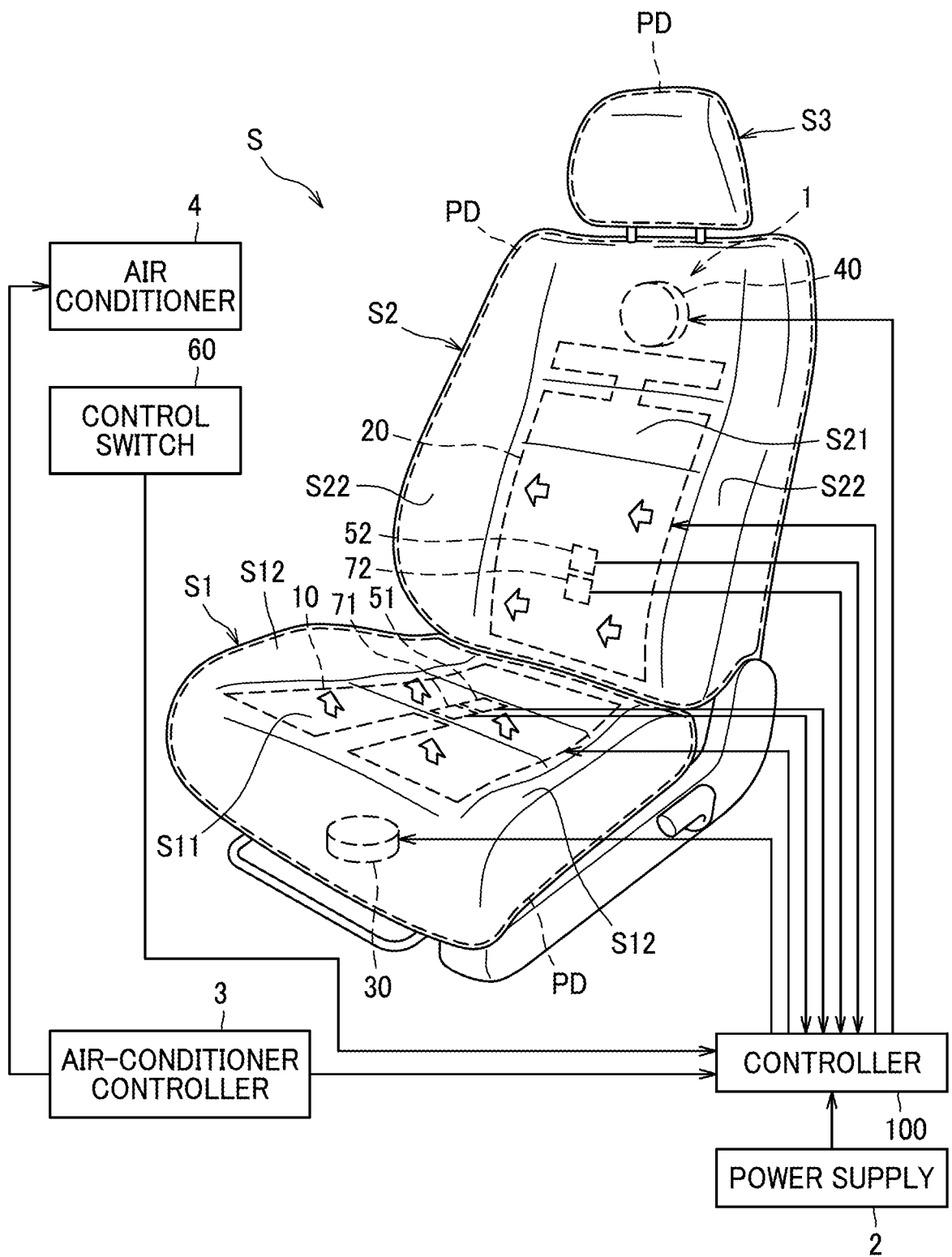
FIG. 7 is perspective view of a vehicle seat according to a second embodiment.

As shown in FIG. 7, the seat heater 1 further includes humidity sensors 71, 72.

The humidity sensor 71 is disposed inside the outer covering material at the seat surface portion S11 that is a portion corresponding to the first heater unit 10. The humidity sensor 72 is disposed inside the outer covering material at the seat surface portion S21 that is a portion corresponding to the second heater unit 20. The humidity sensors 71, 72 are connected to the controller 100 and configured to produce and transmit information on their sensed humidities (sensed humidities Hs) to the controller 100.

The controller 100 is configured to bring the blowers 30, 40 into operation if sensed humidities Hs obtained from the humidity sensors 71, 72 are not lower than a predetermined humidity Hsth. To be more specific, the controller 100 brings the first blower 30 into operation if a sensed humidity Hs obtained from the humidity sensor 71 becomes not lower than the predetermined humidity Hsth, and thereafter causes the first blower 30 to stop operation if the sensed humidity Hs obtained from the humidity sensor 71 becomes lower than the predetermined humidity Hsth. Similarly, the controller 100 brings the second blower 40 into operation if a sensed humidity Hs obtained from the humidity sensor 72 becomes not lower than the predetermined humidity Hsth, and thereafter causes the second blower 40 to stop operation if the sensed humidity Hs obtained from the humidity sensor 72 becomes lower than the predetermined humidity Hsth. It is to be understood that the predetermined humidity Hsth for use in controlling the blower 30 and the predetermined humidity Hsth for use in controlling the blower 40 may have the same value or values different from each other.

Figure 8:
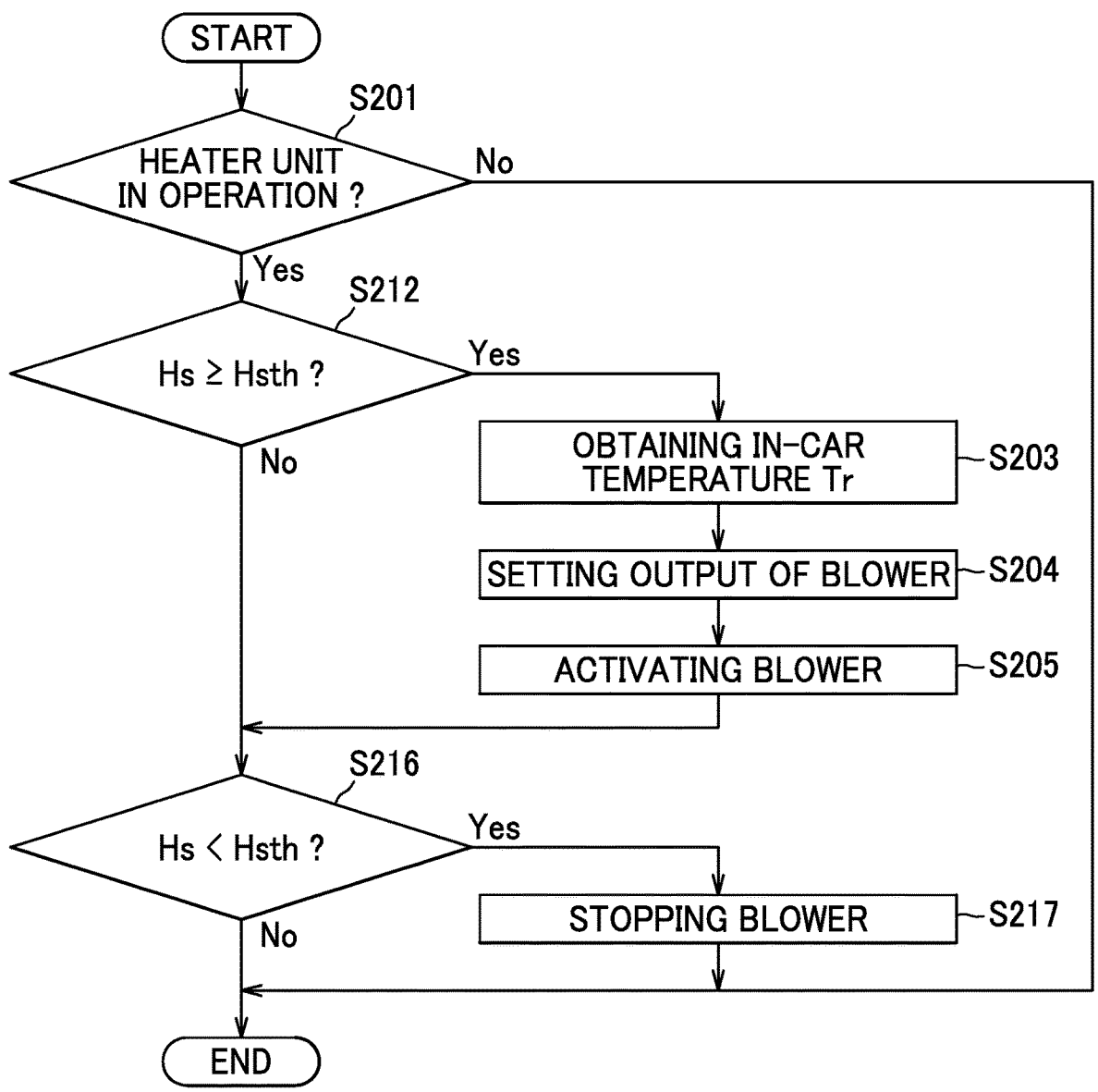
FIG. 8 is a flowchart showing a process of control exercised over a blower by the controller configured according to the second embodiment.

As shown in FIG. 8, if the heater unit 10, 20 is in operation (Yes, in S201), the controller 100 determines whether or not the sensed humidity Hs is higher than or equal to the predetermined humidity Hsth (S212). If the sensed humidity Hs is higher than or equal to the predetermined humidity Hsth (Yes, in S212), then the controller 100 obtains the in-car temperature Tr (S203), and sets an output of the blower 30, 40 retrieved from the map of FIG. 3 (S204). Thereafter, the controller 100 brings the blower 30, 40 into operation, causing the blower 30, 40 to operate at this set output (S205).

Thereafter, the controller 100 determines whether or not the sensed humidity Hs is lower than the predetermined humidity Hsth (S216). If the sensed humidity Hs is not lower than the predetermined humidity (No, in S216), then the controller 100 keeps the blower 30, 40 in operation and brings this cycle of the process to an end. On the other hand, if the sensed humidity Hs is lower than the predetermined humidity Hsth (Yes, in S216), then the controller 100 causes the blower 30, 40 to stop operation (S217), and brings this cycle of the process to an end. In step S212, if the sensed humidity Hs is not higher than or equal to the predetermined humidity Hsth (No, in S212), then the controller 100 proceeds to step S216, and executes the process onward.

It is to be understood that although the present embodiment is described on the premise that the threshold values for activating the blower 30, 40 and for stopping the blower 30, 40 take the same threshold value (predetermined humidity Hsth), these threshold values may be different.

Next, a description will be given of a third embodiment.

Figure 9:
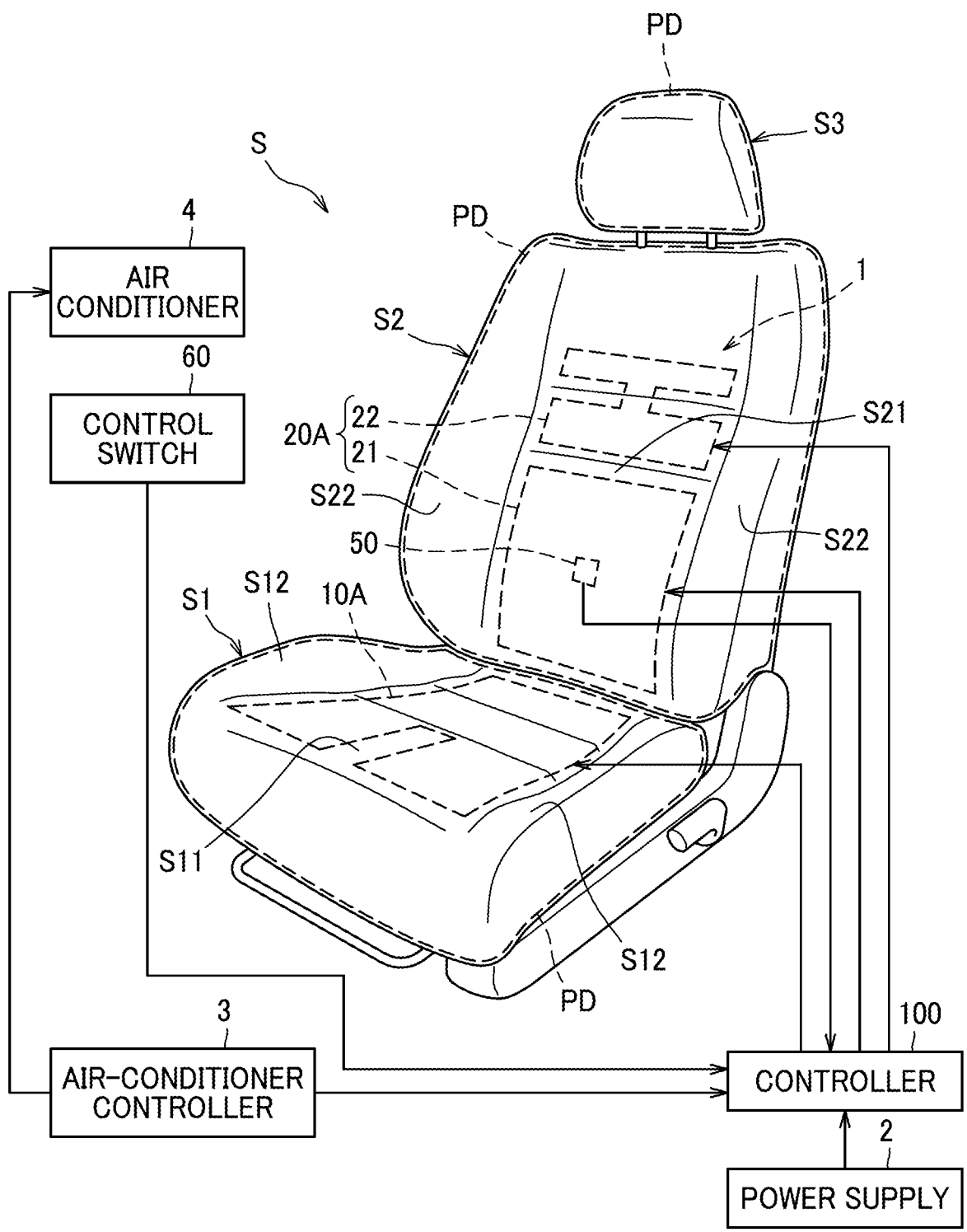
FIG. 9 is a perspective view of a vehicle seat according to a third embodiment.

As shown in FIG. 9, a seat heater 1 mainly includes a cushion heater unit 10A and a back heater unit 20A as an example of a plurality of heater units disposed at different portions of the car seat S, a temperature sensor 50, a control switch 60, and a controller 100.

The cushion heater unit 10A and the back heater unit 20A are each configured as a sheet-type heater. The cushion heater unit 10A is disposed between the pad material and the outer covering material of the seat cushion S1. To be more specific, the cushion heater unit 10A is disposed at a portion corresponding to the seat surface of the seat cushion S1, i.e., at the seat surface portion S11.

The back heater unit 20A is disposed between the pad material and the outer covering material of the seat back S2. To be more specific, the back heater unit 20A is configured to comprise a waist heater unit 21 and a shoulder heater unit 22. The waist heater unit 21 is disposed at a portion corresponding to the waist of the seated occupant, more specifically, at a lower portion of the seat surface portion S21 of the seat back S2. The shoulder heater unit 22 is disposed above the portion corresponding to the waist of the seated occupant, for example, at a portion corresponding to shoulders (at or around blade bone) or the like of the seated occupant. To be more specific, the shoulder heater unit 22 is disposed at an upper portion of the seat surface portion S21.

The cushion heater unit 10A, the waist heater unit 21 and the shoulder heater unit 22 are each connected to the controller 100. In the present embodiment, the waist heater unit 21 corresponds to "third heater unit" and the cushion heater unit 10A and the shoulder heater unit 22 correspond to "fourth heater unit".

The temperature sensor 50 is disposed inside the outer covering material at a lower portion of the seat surface portion S21 that is a portion corresponding to the waist heater unit 21. The temperature sensor 50 is connected to the controller 100, and configured to produce and transmit information on its sensed temperature to the controller 100. It is to be understood that there is a fairly definite correlation between the temperature sensed by the temperature sensor 50 and the temperature of a portion of the seat surface portion S21 with which the seated occupant is in contact. Accordingly, the controller 100 may be configured to use the temperature sensed by the temperature sensor 50 as a sensed temperature Ts for control, or may be configured to estimate the temperature of the portion with which the seated occupant is in contact, based on the correlation mentioned above and use the estimated temperature as the sensed temperature Ts for control.

The controller 100 is a device that controls the outputs of the plurality of heater units 10A, 21, 22, and is disposed in an appropriate location inside the car seat S. The controller 100 is supplied with electric power from a battery-type power supply 2 installed in the car, and configured to use this electric power to regulate the outputs of the heater units 10A, 21, 22.

The controller 100 is configured to exercise, upon receipt of an instruction to heat the car seat S issued when the control switch 60 is thrown, a first control under which the temperatures of the seat surface portions S11, S21 are raised quickly, and a second control under which the outputs of the heater units 10A, 21, 22 are regulated individually for the respective heater units 10A, 21, 22 after the temperatures of the seat surface portions S11, S21 are increased to a sufficient level.

It is to be noted that there is a possibility that the temperatures of the seat surface portions S11, S21 have already been high enough at a time when an instruction of heating issued through the control switch 60 is received, such as in the warm season, or in a case where the heater was once used before the control switch 60 is thrown. In this occasion, the controller 100 may execute the second control from the beginning without executing the first control.

The controller 100, in the first control, sets the output rates of the heater units 10A, 21, 22 equated among all the heater units 10A, 21, 22, until the temperature of the portion (lower portion of the seat surface portion S21) at which the waist heater unit 21 is disposed and at which the temperature sensor 50 is disposed is increased to a predetermined temperature Tsth. To be more specific, in the first control, the controller 100 sets the output rates of all the heater units 10A, 21, 22 at 100%. Hereupon, the output rate of each heater unit 10A, 21, 22 is defined as a rate of an output to a maximum output of the heater unit 10A, 21, 22.

After the temperature of the lower portion of the seat surface portion S21 reaches the predetermined temperature Tsth, to be more specific, after the sensed temperature Ts obtained from the temperature sensor 50 becomes equal to or higher than the predetermined temperature Tsth, the controller 100 determines that the temperatures not only of the lower portion of the seat surface portion S21 but also of the upper portion of the seat surface portion S21 as well as of the seat surface portion S11 have been increased sufficiently, and executes the second control. In the present embodiment, there is only one temperature sensor 50 provided at the lower portion of the seat surface portion S21; therefore, the temperature of the upper portion of the seat surface portion S21 and the temperature of the seat surface portion S11 cannot be sensed at all. In this respect, the experiments, simulations or the like are carried out beforehand, and based on that result, the amounts of heat to be supplied to respective portions are adjusted, whereby the car seat S is configured such that when the temperature of the lower portion of the seat surface portion S21 reaches the predetermined temperature Tsth, the temperature of the upper portion of the seat surface portion S21 and the temperature of the seat surface portion S11 also have temperatures equivalent to the predetermined temperature Tsth.

After the sensed temperature Ts becomes equal to or higher than the predetermined temperature Tsth and the controller 100 proceeds to the second control, the controller 100 will not go back to the first control. To this end, when the sensed temperature Ts becomes equal to or higher than the predetermined temperature Tsth, the controller 100 changes a flag F showing an indication to that effect, from '0' indicating the first control to '1' indicating the second control. The initial value of the flag F is 0, and the flag F is reset to 0 when the control switch 60 is turned off or otherwise the power supplied to the controller 100 is stopped.

The controller 100, in the second control, regulates the output rates of the heater units 10A, 21, 22, individually, for the respective heater units 10A, 21, 22. To be more specific, the controller 100 regulates the output rates of the cushion heater unit 10A, the waist heater unit 21 and the shoulder heater unit 22 based on the sensed temperature Ts obtained from the temperature sensor 50 and the in-car temperature Tr obtained from the air-conditioner controller 3.

Figure 10:
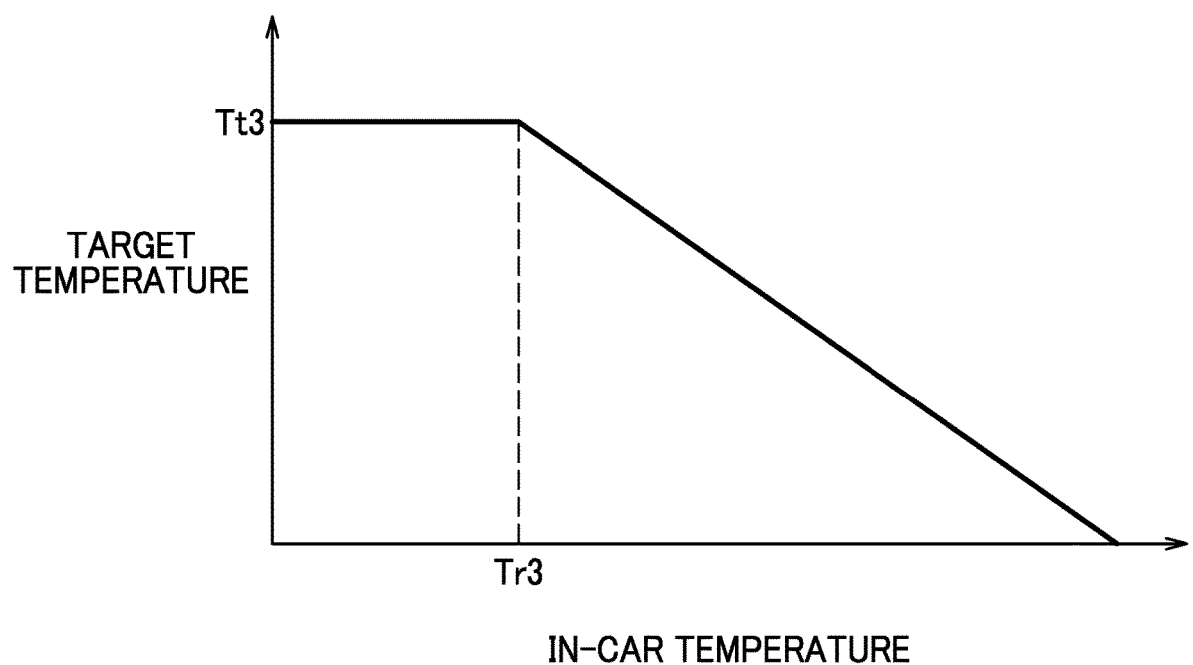
FIG. 10 is an example of a map showing a relationship between the in-car temperature and the target temperature.

More specifically, the controller 100, first, sets a target temperature Tt based on the in-car temperature Tr and a map as shown in FIG. 10. The map shown in FIG. 10 is a map established in advance through experiments, simulations, or the like, for correlating the in-car temperature Tr and the target temperature Tt. In the map of FIG. 10, the target temperature Tt is, for example, characterized as having a constant value Tt3, if the in-car temperature Tr is lower than Tr3, while decreasing according as the in-car temperature Tr increases, if the in-car temperature Tr is not lower than Tr3. By making use of the map as described above to set the target temperature Tt, the controller 10 sets the target temperature Tt for regulating the output rates of the heater units 10A, 21, 22 in accordance with the change in the in-car temperature Tr.

The controller 100 then computes a necessary manipulation amount mv based on the set target temperature Tt and the sensed temperature Ts. The necessary manipulation amount mv may be computed, for example, as input manipulated variable in the so-called PI control:

$$mv = Kp \times e + ie/Ki$$

where e is a difference between the target temperature Tt and the sensed temperature Ts, Kp is a proportional control constant, ie is an integral (integration) of e for a predetermined period of time in the past, and Ki is an integral control constant. Each of the constants Kp, Ki is established in advance through experiments, simulations, or the like.

It is to be understood that the sensed temperature Ts and the target temperature Tt to be assigned for this computation may not necessarily be expressed in the unit degree centigrade (° C.) or the like scale of temperature, but may be numerical values derived from voltages outputted from the temperature sensors 50. Each of the constants Kp, Ki may be adjusted to the scale adopted as these variables for the temperatures. It is also to be understood that the value resulting from the aforementioned computation, mv may exceed 100 if the difference e between the target temperature Tt and the sensed temperature Ts is great. As the electric power is supplied to the heater units 10A, 21, 22 at the output rate of 0 to 100%, the value mv exceeding 100 is assumed to be 100, so that mv has a value not greater than 100.

The controller 100 exercises control over the waist heater unit 21 based on the computed necessary manipulation amount mv (output rate). Also, the controller 100 exercises control over the cushion heater unit 10A based on the output rate that is the necessary manipulation amount mv multiplied by a coefficient C1. Similarly, the controller 100 exercises control over the shoulder heater unit 22 based on the output rate that is the necessary manipulation amount mv multiplied by a coefficient C2. Herein, the coefficients C1, C2 are coefficients smaller than 1, and established in advance through experiments, simulations, or the like.

In the present embodiment, as described above, there is only one temperature sensor 50 provided at the lower portion of the seat surface portion S21; therefore, it is not possible to directly regulate the output rate of the shoulder heater unit 22 based on the temperature of the upper portion of the seat surface portion S21 or to directly regulate the output rate of the cushion heater unit 10A based on the temperature of the seat surface portion S11. With this in view, the present embodiment is designed to regulate the output rates of the heater units 10A, 21, 22 individually for the respective heater units 10A, 21, 22 by using the necessary manipulation amount mv computed based on the temperature (sensed temperature Ts) of the lower portion of the seat surface portion S21, and the output rates determined by multiplication of the necessary manipulation amount mv by the coefficients C1, C2.

The research has shown that there exists difference in temperature sensation between the waist and the femoral, shoulder or other region. To be more specific, it has been shown that the temperature at which the waist feels comfortable is higher than the temperature at which the femoral, shoulder or other region feels comfortable. In this respect, the present embodiment is designed such that the necessary manipulation amount mv is computed based on the temperature of the lower portion of the seat surface portion S21 corresponding to the waist at which the comfortable temperature is higher, and the output rates for the seat surface portion S11 corresponding to the femoral or like regions, and the upper portion of the seat surface portion S21 corresponding to the shoulder or like regions, at which regions the comfortable temperatures are lower than at the waist, are computed by multiplication of the necessary manipulation amount mv by the coefficients C1, C2 which are set for respective regions and of which values are smaller than 1.

In the present embodiment, the coefficient C1 has a value greater than a value of the coefficient C2 (C1>C2). Accordingly, in the second control, the output rate (C1×mv) of the cushion heater unit 10A is greater than the output rate (C2×mv) of the shoulder heater unit 22. These settings are chosen in view of the fact that the seat surface portion S11 is a portion constantly in contact with the buttocks and femoral regions of the seated occupant and more likely to make the seated occupant feel warm, while the upper portion of the seat surface portion S21 is a portion which may be in contact with the shoulder or other portions of the seated occupant but may be separated therefrom occasionally depending on the physique or posture of the seated occupant and to which an excessive application of heat greater than is necessary should be avoided in view of energy savings.

It is however to be understood that the coefficients C1, C2 may have approximately equal value, and for example may have the same value, because the research has shown that there is not much difference between a temperature at which the femoral region feels comfortable and a temperature at which the shoulder region feels comfortable.

A description will be given of a process carried out by the controller 100 in the car seat S as described above, with reference made to FIG. 11. The controller 100 repeats the process from START to END as shown in FIG. 11 for each control cycle.

Figure 11:
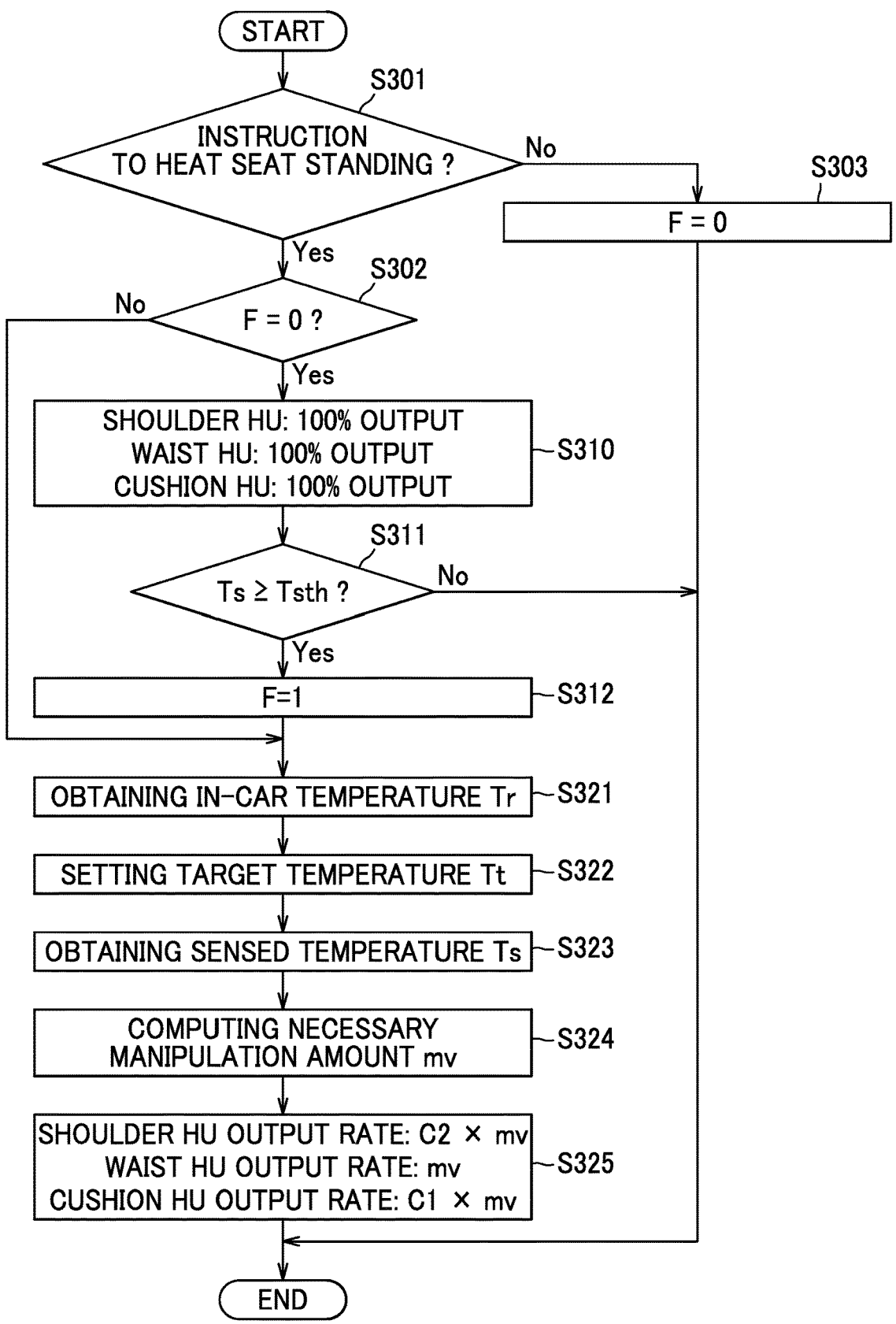
FIG. 11 is a flowchart showing a process of control exercised by the controller.

As shown in FIG. 11, the controller 100 first determines whether or not an instruction to heat the seat stands (S301). If no instruction to heat the seat stands (No, in S301), then the controller 100 resets the flag F indicative of the control mode to 0 (S303), and brings this cycle of the process to an end.

If an instruction to heat the seat stands (Yes, in S301), then the controller 100 determines whether or not the flag F is 0 (S302). If the flag F is 0 (Yes, in S302), then the controller 100 determines to execute a first control and causes all of the cushion heater unit 10A, the waist heater unit 21 and the shoulder heater unit 22 to operate at maximum (100%) output (S310). Thereafter, the controller 100 determines whether or not the sensed temperature Ts is higher than or equal to a predetermined temperature Tsth (S311).

If the sensed temperature Ts is not higher than or equal to the predetermined temperature Tsth (No, in S311), then the controller 100 brings this cycle of the process to an end. On the other hand, if the sensed temperature Ts is higher than or equal to the predetermined temperature Tsth (Yes, in S311), then the controller 100 sets the flag F to 1 (S312), and proceeds to step S321. If the controller 100 determines in step S302 that the flag F is not 0 (i.e., the flag F is 1) (No, in S302), then the controller 100 determines to execute a second control and, in this case as well, proceeds to step S321.

Thereafter, the controller 100 obtains an in-car temperature Tr (S321), and sets a target temperature Tt from the in-car temperature Tr and the map of FIG. 10 (S322). The controller 100 also obtains a sensed temperature Ts (S323). The controller 100 then computes a necessary manipulation amount mv based on the target temperature Tt and the sensed temperature Ts (S324). Thereafter, the controller 100 causes the waist heater unit 21 to operate at an output manipulated according to the necessary manipulation amount mv, and at the same time, causes the cushion heater unit 10A to operate at an output manipulated according to C1×mv, and causes the shoulder heater unit 22 to operate at an output manipulated according to C2×mv (S325), and brings this cycle of the process to an end.

Figure 12:
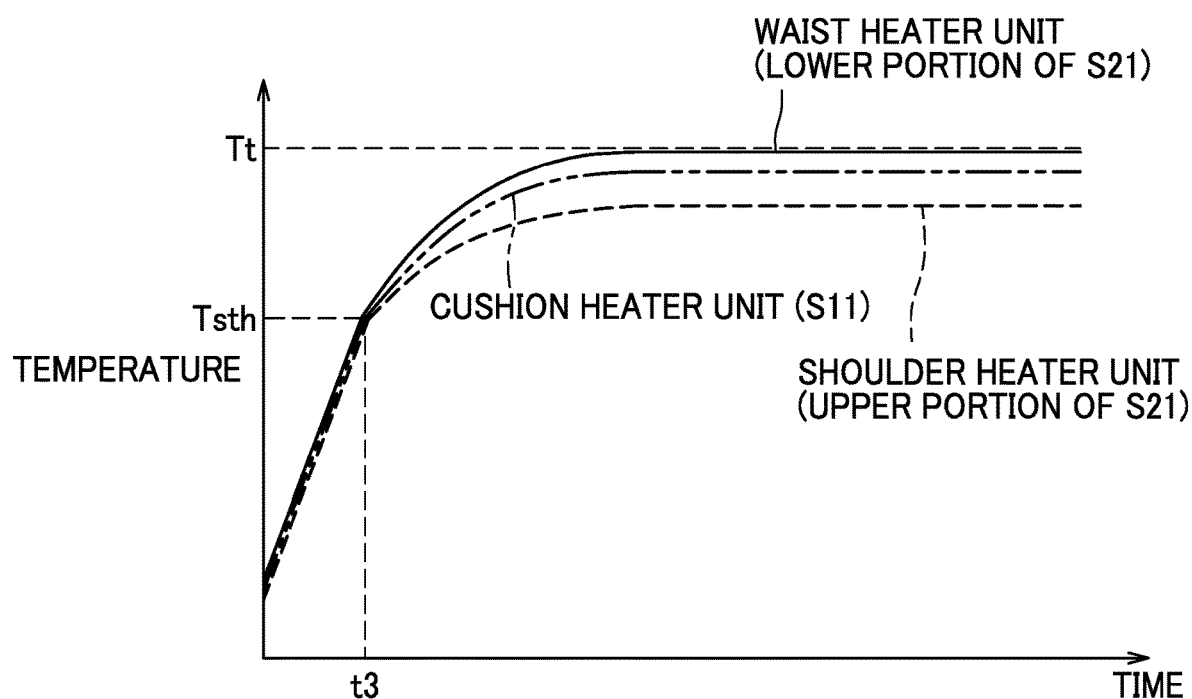
FIG. 12 is a graph showing a change in temperature of a portion at which the heater unit is disposed.

In the process described above, when the seated occupant throws the control switch 60 to start heating the car seat S, the temperatures of the seat surface portions S11, S21 change as shown in FIG. 12. To be more specific, under the first control executed until a time t3, all of the heater units 10A, 21, 22 are caused to operate at 100% outputs. With this configuration, the temperatures of the seat surface portions S11, S12 can be increased as quickly as possible, so that the whole car seat S can be warmed without delay.

At the time t3 when the sensed temperature Ts obtained from the temperature sensor 50 reaches the predetermined temperature Tsth, the second control is executed. Under the second control, the waist heater unit 21 is caused to operate at a first output rate (mv), the cushion heater unit 10A is caused to operate at a second output rate (C1×mv) that is lower than the first output rate, and the shoulder heater unit 22 is caused to operate at a third output rate (C2×mv) that is lower than the second output rate.

Accordingly, the temperature of the lower portion of the seat surface portion S21 corresponding to the waist of the seated occupant at which the comfortable temperature is higher is kept at a high temperature, and the temperatures of the seat surface portion S11 and the upper portion of the seat surface portion S21 corresponding to the femoral region, shoulder region or the like of the seated occupant at which the comfortable temperatures are lower than the comfortable temperature at the waist are lower than the temperature of the lower portion of seat surface portion S21. In this way, the temperatures can be adjusted to their comfortable temperatures for respective portions at which the heater units 10A, 21, 22 are disposed.

In the present embodiment, the temperature of the upper portion of the seat surface portion S21 corresponding to the shoulder of the seated occupant or the like is made lower than the temperature of the seat surface portion S11 corresponding to the femoral region or the like of the seated occupant; therefore, the energy efficiency can be improved more in comparison with an alternative configuration in which the temperature of the upper portion of the seat surface portion S21 is kept at as high a temperature as the temperature of the seat surface portion S11.

To facilitate understanding of the invention, FIG. 12 provided here for reference shows an example where the target temperature Tt has a constant value, that is, the in-car temperature Tr (set temperature for the air conditioner 4) is constant.

According to the present embodiment as described above, in the first control, the output rates of all of the heater units 10A, 21, 22 are equated until the temperatures of portions at which the heater units 10A, 21, 22 are disposed are increased to the predetermined temperature Tsth; therefore, the whole car seat S can be warmed quickly. Moreover, after the whole car seat S is warmed quickly, the output rates of the heater units are regulated individually for the respective heater units 10A, 21, 22 in the second control; therefore, the temperatures of the portions at which the heater units 10A, 21, 22 are disposed can be regulated respectively to achieve comfortable temperature profile.

Since the controller 100 is configured to regulate the output rate of the waist heater unit 21 based on the sensed temperature Ts obtained from the temperature sensor 50, the output rate of the waist heater unit 21 can be regulated precisely.

Since the controller 100 is configured to regulate the output rates (C1×mv, C2×mv) of the cushion heater unit 10A and the shoulder heater unit 22 based on the sensed temperature Ts, provision of another temperature sensor at the seat surface portion S11 or the upper portion of the seat surface portion S21 is not necessitated, so that the cost of the seat heater 1 can be saved.

Since the waist heater unit 21 is disposed at a portion corresponding to the waist, the cushion heater unit 10A is disposed at a portion corresponding to the femoral or other regions, and the shoulder heater unit 22 is disposed at a portion corresponding to the shoulder, provision of the temperature sensor 50 disposed at the portion corresponding to the waist at which the comfortable temperature is higher can serve to ensure precise control on that portion and thus improve the comfort during the quick warming control and the individually regulated control.

Since the controller 100 is configured to set, in the first control, the output rates of all of the heater units 10A, 21, 22 at 100%, the whole car seat S can be warmed more quickly in the first control.

Since the controller 100 is configured to regulate the output rates of the heater units 10A, 21, 22 based on the in-car temperature Tr, the car seat S can be warmed in accordance with the in-car temperature Tr. Accordingly, the comfort ensured during the quick warming control and the individually regulated control can be improved. In addition, since the car seat S is not likely to be made warmer than necessary, improved energy efficiency can be achieved.

Since the controller 100 is configured to set target temperatures in accordance with the change in the in-car temperature Tr, the outputs of the heater units 10A, 21, 22 can be raised or lowered in accordance with the change in the in-car temperature Tr. With this configuration, the comfort can be improved furthermore, and the energy efficiency can be improved furthermore.

Since the controller 100 is configured to obtain, as in-car temperature Tr, a set temperature of the air conditioner 4, the control over the seat heater 1 can be associated with the control over the air conditioner 4. Accordingly, the comfort can be improved furthermore, and the energy efficiency can be improved furthermore. Moreover, the seat heater 1 may not necessarily be provided with a sensor for obtaining the in-car temperature Tr, so that the cost of the seat heater 1 can be saved.

Although the car seat S as specific embodiments of a vehicle seat according to the present invention has been described above, the vehicle seat consistent with the present invention is not limited to the embodiments of the car seat S as described above, and specific configurations may be modified where appropriate.

For example, the controller 100 is configured, in the above-described embodiments, to set the target temperatures Tt for regulating the outputs of the heater units 10, 20, such that a target temperature Tt set when the blowers are in operation is higher than a target temperature Tt set when the blowers are not in operation, but its practicable configurations are not limited thereto. For example, the controller 100 may alternatively be configured to make the outputs of the heater units 10, 20 as set in accordance with sensed temperatures obtained from the temperature sensors 51, 52 higher when the blowers are in operation than when the blowers are not in operation, without changing the target temperatures Tt. To give an example, the outputs of the heater units 10, 20 may be made higher when the blowers are in operation than when the blowers are not in operation by changing the constants Kp, Ki used to compute the necessary manipulation amounts mv when the blowers are in operation from those used when the blowers are not in operation. To give another example, the outputs of the heater units 10, 20 may be made higher when the blowers are in operation than when the blowers are not in operation by multiplying the computed necessary manipulation amounts mv by coefficients.

Moreover, obtainment of the in-car temperature Tr (ambient temperature) is implemented in the above-described embodiments, by obtaining a set temperature of the air conditioner 4, but may alternatively be implemented by obtaining an ambient temperature from an ambient temperature sensor for sensing the temperature of the environment surrounding the seat.

Although the above-described embodiments are configured such that the controller 100 regulates the outputs of the blowers 30, 40 based on the in-car temperature Tr (ambient temperature), the outputs of the blowers 30, 40 may be regulated based on the sensed temperatures obtained by the temperature sensors 51, 52. To be more specific, the controller 100 may be configured to regulate the output of the first blower 30 based on the sensed temperature Ts obtained by the temperature sensor 51, and to regulate the output of the second blower 40 based on the sensed temperature Ts obtained by the temperature sensor 52. Alternatively, the controller may be configured to regulate the outputs of the blowers 30, 40 based on the in-car temperature Tr and the sensed temperatures Ts.

In this alternative implementation, for example, the outputs of the blowers 30, 40 may be set from a map established as a map as in FIG. 3 with its horizontal axis indicating the in-car temperature so replaced by the sensed temperature as to correlate the sensed temperature Ts and the outputs of the blowers 30, 40. In the flowcharts of FIG. 5 and FIG. 8, the step S203 of obtaining the in-car temperature Tr may be replaced by the step of obtaining the sensed temperature Ts. With this modified configuration, the outputs of the blowers 30, 40 can be regulated in accordance with the actual temperatures of the portions corresponding to the heater units 10, 20, so that the humidities of the seat surface portions S11, S21 can be lowered more appropriately in response to the activation of the blowers 30, 40, and the drop in the temperatures of the seat surface portions S11, S21 can be controlled more appropriately. Accordingly, the comfort can be improved furthermore. Moreover, the outputs of the blowers 30, 40 are not likely to become higher than necessary, so that the energy efficiency can be improved.

In the above-described embodiments, the temperature sensors 51, 52 are disposed at the portion corresponding to the first heater unit 10 and the portion corresponding to the second heater unit 20, respectively, but an alternative configuration may be such that only one temperature sensor is disposed at either of the portions corresponding to the heater units may be feasible. In this configuration, for example, while the temperature sensor is disposed only at the portion corresponding to the second heater unit 20, the output of the first heater unit 10 may be computed by multiplying the output of the second heater unit 20 (i.e., computed necessary manipulation amount mv) by a coefficient. In an alternative implementation where the outputs of the blowers 30, 40 are regulated based on the sensed temperature, as well, the output of the first blower 30 may be set by multiplying the output of the second blower 40 (i.e., output retrieved from the sensed temperature and the map) by a coefficient.

In the above-described embodiments, the heater units 10, 20 are disposed at the seat surface portions S11, S21, but feasible arrangement of the heater units is not limited thereto. For example, the heater units may be disposed at a lower portion (i.e., a portion corresponding to the waist of the seated occupant) and an upper portion (i.e., a portion corresponding to a region above the waist or a portion above the portion corresponding to the waist) of the seat surface portion S21, respectively. The heater units may be disposed not only at the seat surface portions S11, S21 but also at projecting portions S12, S22.

In the above-described embodiments, the number of blowers 30, 40 provided is two, but an alternative configuration may only include one blower, or three or more blowers.

In the above-described embodiments, the blowers (air blowers) 30, 40 are illustrated to be of a sirocco fan-type, but a propeller fan-type, a turbo fan-type or any other types of air blowers may be adopted, instead. In the above-described embodiments, the car seat is configured to blow out air by the operation of an air blower, but may be configured to inhale air by the operation of an air blower, instead. An alternative configuration may be feasible such that one of the seat cushion and the seat back is configured to inhale air by the operation of an air blower while the other of the seat cushion and the seat back is configured to blow out air by the operation of an air blower. Also, the blower(s) may be configured to change the direction of rotation of the fans or the like so that the operation can be switched between a blow-out mode and an inhale mode.

In the above-described embodiment, the temperature sensor 50 is disposed only at the portion corresponding to the waist heater unit 21 that is the third heater unit, but the temperature sensor may be disposed at both of a portion corresponding to the third heater unit and a portion corresponding to the fourth heater unit.

Figure 13:
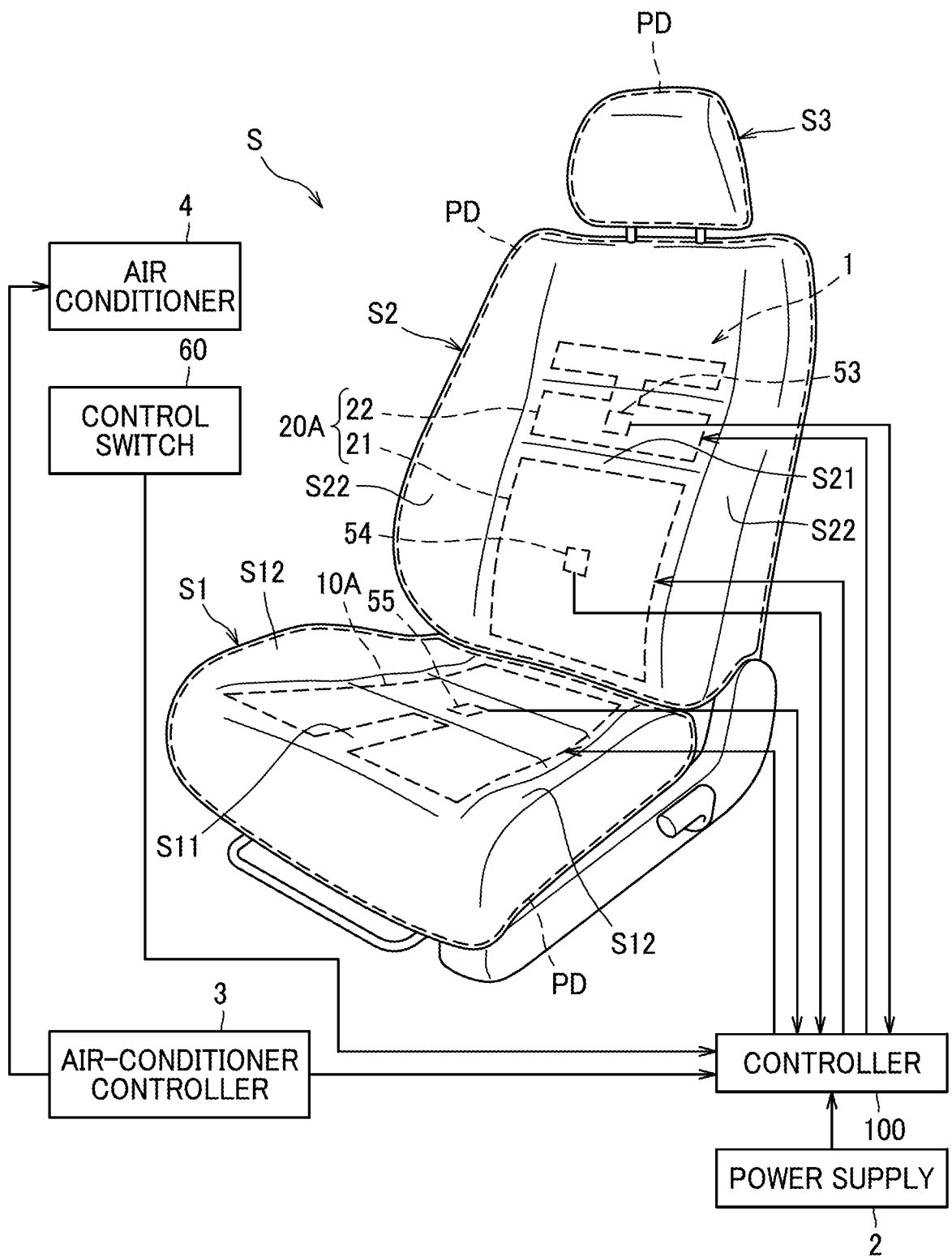
FIG. 13 is a perspective view of a vehicle seat according to a modified example.

To give an example, as shown in FIG. 13, the car seat S may include temperature sensors 53-55, such that the temperature sensor 55 is disposed at the seat surface portion S11 corresponding to the cushion heater unit 10A, the temperature sensor 54 is disposed at the lower portion of the seat surface portion S21 corresponding to the waist heater unit 21, and the temperature sensor 53 is disposed at the upper portion of the seat surface portion S21 corresponding to the shoulder heater unit 22.

In this arrangement, all the heater units 10A, 21, 22 are caused to operate at the same output rate (e.g., 100%) under the first control, and the heater units 10A, 21, 22 may be controlled individually with the output rates computed individually based on the sensed temperatures of the corresponding temperature sensors 53-55 under the second control. With this configuration, the output rates of the respective heater units 10A, 21, 22 can be regulated accurately. It is to be understood that maps for use in setting the target temperatures Tt (see FIG. 10) in this configuration may be prepared for the respective heater units 10A, 21, 22 so as to achieve control exercised individually on the respective portions. The change from the first control to the second control may be effected either at a time when the sensed temperatures of all the temperature sensors 53-55 reach the predetermined temperatures, at a time when the sensed temperatures of any two of the temperature sensors 53-55 reach the predetermined temperatures, or at a time when the sensed temperature of one of the temperature sensors 53-55 reach the predetermined temperature.

In the above-described embodiment, the output rates of all the heater units 10A, 21, 22 are set, in the first control, at 100%, but the output rates lower than 100% may be set, instead.

In the above-described embodiment, the output rate in the second control (i.e., necessary manipulation amount mv) may possibly be equal to the output rate in the first control (i.e., 100%), but the controller 100 may be configured such that the output rates of the heater units 10A, 21, 22 is lower in the second control than in the first control. This can be implemented, for example, by using a predetermined temperature Tsth set at a value higher to some extent. With this alternative implementation, the whole car seat S can be warmed quickly under the first control, and the energy efficiency can be improved under the second control.

In the above-described embodiment, the fourth heater unit is disposed at the seat surface portion S11 and the upper portion of the seat surface portion S21, but the fourth heater unit may be disposed only at the seat surface portion S11, or only at the upper portion of the seat surface portion S21. It is also to be understood that the heater units may be disposed not only at the seat surface portions S11, S21 but also at the projecting portions S12, S22.

Although the car seat S is illustrated in the above-described embodiments by an independent-type seat such as adopted in a driver's seat or a passenger seat next to the driver's seat of an automobile, a bench-type seat such as adopted in a rearmost seat of an automobile may also be compatible. Although the car seat S such as installed in an automobile is illustrated as a seat in the above-described embodiments, the seat may be a vehicle seat as installed in any vehicle other than an automobile, such as a railway cars, ships or aircrafts. Moreover, the seat comprising a seat heater is not limited to a vehicle seat, but may be a seat designed for home use.

The seat is configured, in the above-described embodiments, to be supplied with electric power from a battery-type power supply 2 installed in the car, but not limited to this configuration; for example, the battery may be installed in the seat itself, or if the seat is such a seat as used at home, the seat may be supplied with electric power from the utility power.

The invention claimed is:

1. A vehicle seat, comprising:
a pad material having an air vent formed on a surface thereof and an air passage connected to the air vent;
an outer covering material with which the pad material is covered;
a heater unit disposed between the pad material and the outer covering material;
a temperature sensor disposed at a portion corresponding to the heater unit; and
a controller configured to regulate an output rate of the heater unit, the output rate of the heater unit being a rate of an output to a maximum output;
wherein the heater unit comprises:
a first heater unit, and
a second heater unit disposed at a portion of the seat different from a portion at which the first heater unit is disposed, and
wherein the controller is configured to regulate an output rate of the first heater unit to be lower than an output rate of the second heater unit, after a sensed temperature obtained from the temperature sensor reaches a predetermined temperature.

2. The vehicle seat according to claim 1, wherein the controller is configured to obtain, as the ambient temperature, a set temperature of an air conditioner that regulates the temperature of the environment surrounding the seat.

3. The vehicle seat according to claim 1, wherein the controller is configured to regulate the output of the heater unit such that a temperature of a portion of the seat at which the heater unit is disposed is higher than the ambient temperature.

4. The vehicle seat according to claim 1, wherein the seat comprises:
a plurality of heater units disposed at different portions of the seat; and
the controller configured to regulate outputs of the plurality of heater units, wherein the controller is configured to:
exercise a first control in which, upon receipt of an instruction to heat the seat, output rates of all the heater units, each defined as a rate of an output to a maximum output of each heater unit, are equated until a temperature of at least one of the portions of the seat at which the heater units are disposed is increased to a predetermined temperature, and
exercise a second control in which the output rates of the heater units are regulated individually for the respective heater units after the temperature of the at least one of the portions at which the heater units are disposed reaches the predetermined temperature.

5. The vehicle seat according to claim 4, wherein the plurality of heater units comprise:
a third heater unit, and
a fourth heater unit,
wherein the vehicle seat further comprises:
a temperature sensor disposed at a portion corresponding to the third heater unit, and
wherein the controller is configured to regulate an output rate of the third heater unit based on a sensed temperature obtained from the temperature sensor.

6. The vehicle seat according to claim 4, wherein the controller is configured to set, in the first control, the output rates of all the heater units at 100%.

7. The vehicle seat according to claim 4, wherein the controller is configured to regulate the output rates of the heater units based on an ambient temperature that is a temperature of an environment surrounding the seat.

8. The vehicle seat according to claim 4, wherein the controller is configured to make the output rates of the heater units lower in the second control than in the first control.

9. The vehicle seat according to claim 5, wherein the controller is configured to regulate an output rate of the fourth heater unit based on the sensed temperature.

10. The vehicle seat according to claim 5, wherein the third heater unit is disposed at a portion corresponding to a waist of an occupant seated on the seat,
wherein the fourth heater unit is disposed at at least one of a portion corresponding to a seat surface of a seat cushion and a portion above the portion corresponding to the waist.

11. The vehicle seat according to claim 7, wherein the controller is configured to set target temperatures for regulating the output rates of the heater units in accordance with a change in the ambient temperature.

12. The vehicle seat according to claim 7, wherein the controller is configured to obtain, as the ambient temperature, a set temperature of an air conditioner that regulates the temperature of the environment surrounding the seat.

13. The vehicle seat according to claim 1, further comprising:
an air blower disposed at a position corresponding to the heater unit, the air blower being connected to the air passage,
wherein the controller is configured to regulate output of the heater unit and the air blower by:
activating the heater unit to start heating the outer covering material when the air blower is not operating,
activating the air blower if a predetermined period of time has passed since the heater unit was activated, and
regulating the output of the heater unit to be higher when the air blower is operating than when the air blower is not operating.

14. The vehicle seat according to claim 1, further comprising:
a seat cushion;
a seat back; and
a headrest,
wherein the seat cushion, the seat back, and the headrest are upholstered with the pad material and the outer covering material, and
wherein the first heater unit is disposed at a seat surface portion of the seat cushion, and the second heater unit is disposed at a lower portion of a seat surface portion of the seat back.

15. The vehicle seat according to claim 13, wherein the controller is configured to regulate the output of the air blower by changing the output based on an ambient temperature that is a temperature of an environment surrounding the seat.

16. The vehicle seat according to claim 15, wherein the controller is configured to set the outputs of the air blower and the heater unit in accordance with a change in the ambient temperature.

17. The vehicle seat according to claim 13,
wherein the controller is configured to regulate the output of the air blower by changing the output based on a sensed temperature obtained from the temperature sensor.

18. The vehicle seat according to claim 13,
wherein the air blower comprises:
a first air blower disposed at a portion corresponding to the first heater unit; and
a second air blower disposed at a portion corresponding to the second heater unit, and
wherein the controller is configured to regulate the output of the first air blower and the output of the second air blower-individually.

19. The vehicle seat according to claim 13, wherein the controller is configured to set target temperatures for regulating the output of the heater unit, such that a target temperature set is higher when the air blower is operating than a target temperature set when the air blower is not operating.

20. The vehicle seat according to claim 13,
wherein the controller is configured to make the output of the heater unit as set in accordance with a sensed temperature obtained from the temperature sensor higher when the air blower is operating than when the air blower is not operating.

* * * * *